United States Patent [19]
Katayose et al.

[11] Patent Number: 4,923,932
[45] Date of Patent: May 8, 1990

[54] POLYPHENYLENE ETHER RESIN COMPRISING CHLOROFORM EXTRACTABLE/NONEXTRACTABLE POLYPHENYLENE ETHER RESIN

[75] Inventors: Teruo Katayose, Sakura; Hiroji Oda, Kawasaki, both of Japan

[73] Assignee: Asahi Kasei Kogyo Kabushiki Kaisha, Osaka, Japan

[21] Appl. No.: 242,234

[22] Filed: Sep. 9, 1988

[30] Foreign Application Priority Data

| Sep. 9, 1987 | [JP] | Japan | 62-224146 |
| Sep. 9, 1987 | [JP] | Japan | 62-224147 |
| Oct. 27, 1987 | [JP] | Japan | 62-269459 |
| Oct. 27, 1987 | [JP] | Japan | 62-269460 |

[51] Int. Cl.$^5$ ............................................. C08G 65/44
[52] U.S. Cl. .................................... 525/391; 525/390; 525/392; 525/534; 525/535
[58] Field of Search ............ 525/391, 390, 392, 534, 525/535

[56] References Cited

U.S. PATENT DOCUMENTS

| 3,281,393 | 10/1966 | Tsou et al. | 260/47 |
| 3,422,062 | 1/1969 | Segal et al. | 260/47 |
| 3,522,326 | 7/1970 | Bostick et al. | 260/823 |
| 4,634,742 | 1/1987 | Percec | 525/390 |
| 4,806,601 | 2/1989 | Percec | 525/391 |

FOREIGN PATENT DOCUMENTS

| 56-120729 | 9/1981 | Japan . |
| 58-27719 | 2/1983 | Japan . |
| 2020296 | 11/1979 | United Kingdom . |

OTHER PUBLICATIONS

Journal of Polymer Science, vol. 49, pp. 267–275, (1961).
Makromol. Chem., 182, pp. 2361–2369, (1981).
Makromol. Chem., 183, pp. 1889–1895, (1982).
Journal of Polymer Science, vol. 58, pp. 581–591, (1962).

*Primary Examiner*—Harold D. Anderson
*Attorney, Agent, or Firm*—Armstrong, Nikaido, Marmelstein, Kubovcik & Murray

[57] ABSTRACT

A novel cured polyphenylene ether resin is disclosed comprising a chloroform nonextractable polyphenylene ether and a chloroform extractable polyphenylene ether. By subjecting the resin to pyrolysis gas chromatography, the resin is decomposed to form 3,5-dimethylphenol specifically. The chloroform extractable polyphenylene ether is contained in the resin in an amount of 0.01 to 20% by weight and comprises polyphenylene ether units substituted by an alkenyl group and/or an alkynyl group. The novel cured polyphenylene ether resin has excellent mechanical properties, electrical properties, heat resistance and chemical resistance. The cured polyphexylene ether resin is prepared by curing a novel curable polyphenylene ether resin comprising polyphenylene ether units substituted with an alkenyl groups and/or an alkynyl groups at a specific average substitution degree. The novel curable polyphenylene ether resin has not only excellent mechanical properties and desired electric properties such as a low dielectric constant and a low dielectric dissipation factor, but also excellent melt processability and storage properties.

17 Claims, 5 Drawing Sheets

POLYPHENYLENE ETHER RESIN COMPRISING CHLOROFORM EXTRACTABLE/NONEXTRACTABLE POLYPHENYLENE ETHER RESIN

BACKGROUND OF THE INVENTION

FIELD OF THE INVENTION

The present invention relates to a cured polyphenylene ether resin and a curable polyphenylene ether resin. More particularly, the present invention is concerned with a novel cured polyphenylene ether resin comprising a chloroform nonextractable polyphenylene ether and a chloroform extractable polyphenylene ether, and which is decomposable by pyrolysis gas chromatography to form various types of methyl-substituted phenols, particularly 3,5-dimethylphenol in a specific amount, and contains a relatively small amount of a chloroform extractable polyphenylene ether containing polyphenylene ether units substituted by an alkenyl group and/or an alkynyl group. The cured polyphenylene ether resin is excellent not only in mechanical properties and desired electrical properties, such as a low dielectric constant and a low dielectric dissipation factor, but also in heat resistance and chemical resistance. Therefore, the cured polyphenylene ether resin can advantageously be used as a dielectric material, an insulating material, a heat resistant material and the like in, for example, electrical and electronic industries.

The present invention is also concerned with a novel curable polyphenylene ether resin having a specific average substitution degree of an alkenyl group and/or an alkynyl group, which has not only excellent mechanical properties and desired electrical properties, such as a low dielectric constant and a low dielectric dissipation factor, but also excellent melt processability and storage properties.

DISCUSSION OF RELATED ART

In recent years, minimization and high-packingdensity mounting have been strongly desired in the field of electronic devices for communication, house-service, industries and the like. Accordingly, materials for such devices having excellent heat resistance, dimensional stability and electrical properties such as a low dielectric constant have been strongly desired. For example, a copper-clad laminate made of a substrate containing a thermosetting resin such as a phenol resin and an epoxy resin has been used as a printed circuit board. However, these resins have a drawback in that the resins have undesirable electrical properties, particularly a high dielectric constant in a high frequency range, although the resins have an excellent balance of various properties.

For overcoming the above-mentioned drawback, a polyphenylene ether has been attracting attention as a new material, and it has been attempted to apply a polyphenylene ether to a copper-clad laminate. Indeed, a polyphenylene ether is one of the typical engineering plastics which has not only excellent mechanical but also desired electrical properties, such as a low dielectric constant and a low dielectric dissipation factor, and has also a relatively good heat resistance. However, when a polyphenylene ether is used as a material for a printed circuit board substrate, the heat resistance of it is insufficient. A material for a printed circuit board substrate is required to have an extremely high heat resistance, because a printed circuit board substrate is necessarily exposed to high temperatures in soldering. However, substrates made of conventional polyphenylene ethers are likely to undergo distortion at temperatures higher than about 200° C., thereby causing a considerable decrease in mechanical properties and peeling off of copper foils provided as circuits on the surface of the substrate. A polyphenylene ether has also another drawback in that it has such poor resistance to an aromatic hydrocarbon and a hydrocarbon substituted by a halogen atom that it is dissolved in such hydrocarbons, although the polyphenylene ether has excellent resistance to acids, alkalis and hot water.

As a method for improving the heat resistance and chemical resistance of a polyphenylene ether, it has been attempted to introduce crosslinkable functional groups in a polyphenylene ether chain to obtain a curable polyphenylene ether, which is, however, not effective for overcoming the serious drawbacks inherent in polyphenylene ethers. For example, as polyphenylene ethers in which crosslinkable functional groups are introduced, Kurian et al. disclose a homopolymer of 2-allyl-6-methylphenol and a homopolymer of 2,6-diallylphenol [see Journal of Polymer Science, Vol. 49, page 267 (1961)]. However, these homopolymers have a low molecular weight, and cannot be practically used because they cure in only a few weeks when they are allowed to stand in the air.

U.S. Pat. Nos. 3,281,393 and 3,422,062 disclose a copolymer of 2,6-dimethylphenol and 2-allyl-6-methylphenol and a copolymer of 2,6-dimethylphenol and 2,6-diallylphenol. These copolymers have a high molecular weight. However, the softening temperatures of the copolymers are higher than their curing temperatures and, therefore, the melt-molding of the copolymer is infeasible.

In order to improve the melt-moldability of the copolymer, it has been proposed to add a large amount of a plasticizer to the copolymer (see U.S. Pat. No. 3,422,062). However, the use of a large amount of a plasticizer leads to not only an impairment of desired electric properties such as a low dielectric constant and a low dielectric dissipation factor of a polyphenylene ether, but also to a decrease in heat resistance and chemical resistance. Further, the tensile strength at break of the cured product of the copolymer becomes extremely low, that is, as low as about 28 kg/cm$^2$ at 24° C. (see Example 7 of U.S. Pat. No. 3,422,062) and, therefore, it is of no practical use.

Tsuchida et al disclose polyphenylene ethers containing double bonds other than those of allyl groups, such as a polymer of 2-substituted allyl-6-methylphenol and a polymer of 2,6-di-substituted allylphenol [see Japanese Patent Application Laid-Open Specification Nos. 56-120729 and 58-27719; Makromol. Chem., 182, 2361 (1981) and ibid., 183, 1889 (1982)]. The authors studied the oxidative polymerizability of a 2,6-di-substituted phenol having a double bond in its side chain, and made the following findings:

(1) when a monomer having a double bond conjugated with an aromatic ring of a phenol, such as 2,6-divinylphenol, is polymerized, crosslinking and branching are caused during the polymerization due to the presence of the conjugated double bond and, therefore, a straight-chain polyphenylene ether cannot be produced; and (2) with respect to a monomer having a double bond at a position apart from an aromatic ring of a phenol, polymerization of the monomer does not occur due to a steric bulkiness of the monomer.

From the above-mentioned findings, Tsuchida et al concluded that a 2,6-disubstituted phenol, at least one substituent of which is a substituted allyl group, is the only monomer which can be polymerized to provide a polyphenylene ether having a reactive double bond in its side chain. As the substituted allyl group, they disclose a butenyl group, a prenyl group, a cinnamyl group, etc. They also disclose that the double bond of the substituted allyl group can be utilized for not only a reaction for grafting a vinyl monomer on the polyphenylene ether chain by the radical polymerization of a vinyl monomer but also halogenation, epoxidation and amination reactions. However, the polymer of Tsuchida et al has a disadvantage in that it is necessary to use an expensive phenol having a double bond of a butenyl group, a prenyl group or a cinnamyl group for producing a polyphenylene ether having a double bond. In addition, it is noted that Tsuchida et al do not disclose the crosslinking property, thermal properties and other physical properties of their polyphenylene ether.

As a polyphenylene ether having a double bond conjugated with the aromatic ring of each phenol, there is disclosed a vinyl group-substituted polyphenylene ether (see U.S. Patent No. 4,634,742). The vinyl group-substituted polyphenylene ether of this patent is produced by polymerizing 2,6-dimethylphenol and then converting the methyl groups of the resultant polymer into vinyl groups or introducing vinyl groups to the 3- and 5-positions of the phenyl group of the polymer. The vinyl groups introduced in the polyphenylene ether in the above process are not bonded to the aromatic ring of the polyphenylene ether through a flexible carbon chain or an ether bond but are directly bonded to the aromatic ring of the polyphenylene ether. When such a vinyl group-substituted polyphenylene ether is subjected to crosslinking, the resultant cured resin is poor in flexibility and is extremely brittle. Therefore, such a polyphenylene ether cannot be practically used. This type of polyphenylene ether is also disadvantageous in that because it is poor in susceptibility to crosslinking, high temperatures, such as 300° C. or more, are required for crosslinking.

The vinyl group-substituted polyphenylene ether mentioned above can be prepared by reacting a polyphenylene ether with bromine to brominate the methyl groups at the 2- and 6-positions of a phenyl group or subjecting a polyphenylene ether to Friedel-Crafts reaction with 1-chloromethoxy-4-chlorobutane in the presence of tin tetrachloride to introduce chloromethyl groups to the 3- and 5-positions of a phenyl group, and then reacting the thus introduced halomethyl groups with triphenylphosphine to convert each halomethyl group into a phosphonium salt, followed by subjecting the phosphonium salt to Wittig reaction using formaldehyde and sodium hydroxide to convert the phosphonium salt into a vinyl group. However, this method is industrially disadvantageous in that three reaction steps and special chemicals are needed for the introduction of vinyl groups to the polyphenylene ether.

In addition to an allyl group and a vinyl group, an alkynyl group such as an ethynyl group has been known as one of the representative examples of crosslinkable functional groups. However, actual introduction of an alkynyl group to a polyphenylene ether has never been disclosed.

In these situations, it has been desired to develop a cured polyphenylene ether resin having excellent heat resistance and chemical resistance without sacrificing the excellent mechanical properties and electrical properties, such as a low dielectric constant and a low dielectric dissipation factor, inherent in a polyphenylene ether. It has also been desired to develop a curable polyphenylene ether resin which is excellent not only in desired electrical properties such as a low dielectric constant and a low dielectric dissipation factor and mechanical properties but also in melt processability and storage properties.

SUMMARY OF THE INVENTION

The present inventors have made extensive and intensive studies with a view toward developing a cured polyphenylene ether resin which is excellent not only in mechanical properties and desired electrical properties such as a low dielectric constant and a low dielectric dissipation factor but also in heat resistance and chemical resistance. As a result, they have unexpectedly succeeded in producing a novel cured polyphenylene ether resin comprising a chloroform nonextractable polyphenylene ether and a chloroform extractable polyphenylene ether, and which is decomposable by pyrolysis gas chromatography to form various types of methyl-substituted phenols, particularly 3,5-dimethylphenol in a specific amount, and contains a relatively small amount of a chloroform extractable polyphenylene ether containing polyphenylene ether units substituted with at least one substituent selected from the group consisting of an alkenyl group and an alkynyl group. They have found that the cured polyphenylene ether resin is excellent not only in mechanical properties and desired electrical properties such as a low dielectric constant and dielectric dissipation factor but also in heat resistance and chemical resistance. They have also found that a curable polyphenylene ether resin in which at least one substituent selected from the group consisting of an alkenyl group and an alkynyl group is introduced at a specific average substitution degree, has not only excellent mechanical properties and desired electrical properties, such as a low dielectric constant and a low dielectric dissipation factor, but also excellent melt processability and storage properties. Based on these novel findings, the present invention has been completed.

It is, therefore, an object of the present invention to provide a cured polyphenylene ether resin which is excellent not only in mechanical properties and desired electrical properties such as a low dielectric constant and a low dielectric dissipation factor, but also in heat resistance and chemical resistance.

It is another object of the present invention to provide a curable polyphenylene ether resin which has not only excellent mechanical properties and desired electrical properties, such as a low dielectric constant and a low dielectric dissipation factor, but also excellent melt processability and storage properties.

The foregoing and other objects, features and advantages of the present invention will be apparent to those skilled in the art from the following detailed description and appended claims taken in connection with the accompanying drawings.

DETAILED DESCRIPTION OF THE INVENTION

Figure 1:
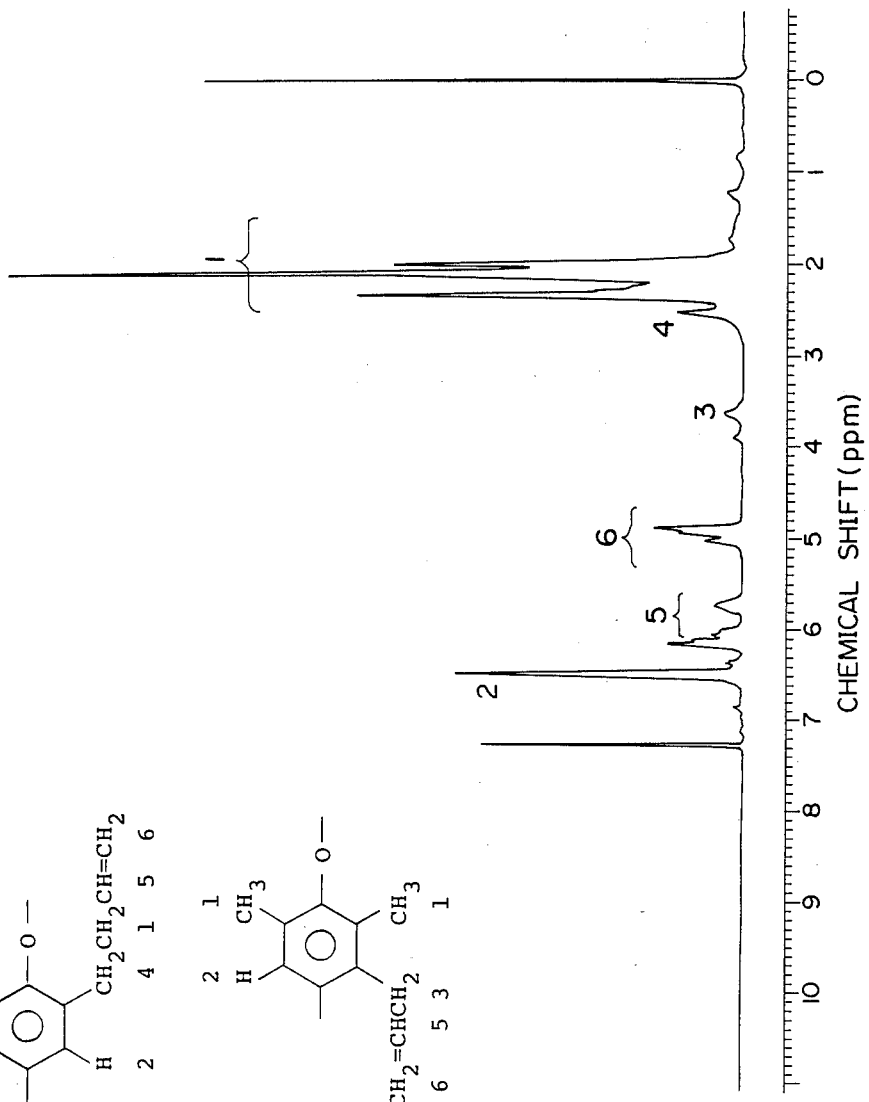
FIG. 1 is the $^1$H-nuclear magnetic resonance ($^1$H-NMR) spectrum of a curable polyphenylene ether resin of the present invention obtained in Example 6.

In one aspect of the present invention, there is provided a cured polyphenylene ether resin comprising a chloroform nonextractable polyphenylene ether and a chloroform extractable polyphenylene ether. The resin is decomposable by pyrolysis gas chromatography to form (a) 2-methylphenol, (b) 2,6-dimethylphenol, (c) 2,4-dimethylphenol, (d) 3,5dimethylphenol and (e) 2,4,6-trimethylphenol in proportions such that said components (a), (b), (c), (d) and (e) satisfy the following inequality:

$$40 \geq \frac{D}{A + B + C + D + E} \times 100 \geq 7.0(\%),$$

wherein A, B, C, D and E represent the areas of peaks on a pyrolysis gas chromatogram attributed to said components (a), (b), (c), (d) and (e), respectively.

The chloroform extractable polyphenylene ether is present in an amount of from 0.01 to 20 % by weight, based on the weight of said resin, as determined from the amount of a chloroform extract obtained by treating the resin with chloroform at 23° C. for 12 hours, and contains units of the formula:

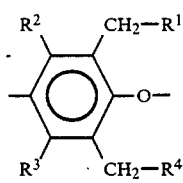

(I)

wherein $R^1$, $R^2$, $R^3$ and $R^4$ each independently represent a hydrogen atom, an alkenyl group represented by the formula:

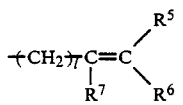

(II)

wherein l is an integer of from 1 to 4, and $R^5$, $R^6$ and $R^7$ each independently represent a hydrogen atom or a methyl group, or an alkynyl group represented by the formula:

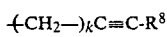

(III)

wherein k is an integer of from 1 to 4 and $R^8$ represents a hydrogen atom, a methyl group or an ethyl group, at least one of $R^1$, $R^2$, $R^3$ and $R^4$ being other than hydrogen, with the proviso that each unit is the same or different.

The cured polyphenylene ether resin of the present invention is substantially comprised of polyphenylene ether structural units. This can be confirmed by infrared spectroscopy (IR), high resolution solid NMR, pyrolysis gas chromatography, or other known techniques. Among these, pyrolysis gas chromatography provides a particularly useful analytical means. Especially when pyrolysis gas chromatography is used, the present cured resin can readily be distinguished from conventional cured polyphenylene ether resins as described below.

The cured polyphenylene ether resin of the present invention is decomposable by pyrolysis gas chromatography, particularly by pyrolysis of the resin at 500° C. for 4 sec in an inert gas atmosphere, to form a characteristic decomposition product containing five components, i.e., (a) 2-methylphenol, (b) 2,6-dimethylphenol, (c) 2,4-dimethylphenol, (d) 3,5-dimethylphenol and (e) 2,4,6-trimethylphenol. Of these five decomposition product components, components (a), (b), (c) and (e) are found in decomposition products of conventional polyphenylene ether resins also. The mechanism of formation of such decomposition product components is described for example, in J. Appl. Poly. Sci., vol. 22, page 2891 (1978). However, component (d), i.e. 3,5-dimethylphenol, is specifically formed from the cured polyphenylene ether resin of the present invention, and is not found in decomposition products of conventional polyphenylene ether resins.

In this connection, it should further be noted that when the cured polyphenylene ether resin of the present invention is decomposed by pyrolysis gas chromatography, components (a), (b), (c), (d) and (e) are formed in proportions such that these satisfy the following inequality:

$$40 \geq \frac{D}{A + B + C + D + E} \times 100 \geq 7.0(\%),$$

wherein A, B, C, D and E represent the areas of peaks attributed to said components (a), (b), (c), (d) and (e), respectively.

When the ratio of $$\frac{D}{A + B + C + D + E} \times 100$$

is less than 7.0 %, the curing degree of the cured polyphenylene ether resin is insufficient so that the resin has disadvantageously poor thermal resistance and chemical resistance. On the other hand, when the ratio exceeds 40 %, the curing degree of the cured polyphenylene ether resin is too high, so that the resin is disadvantageously brittle.

The mechanism of formation of 3,5-dimethylphenol from the present cured resin has not yet been elucidated. However, the following explanation may be plausible. In the above-mentioned literature i.e., J. Appl. Poly. Sci., vol. 22, page 2891 (1978), it is taught that a reaction of Fries type rearrangement occurs in the pyrolysis of conventional polyphenylene ethers, as shown in formula (α) below.

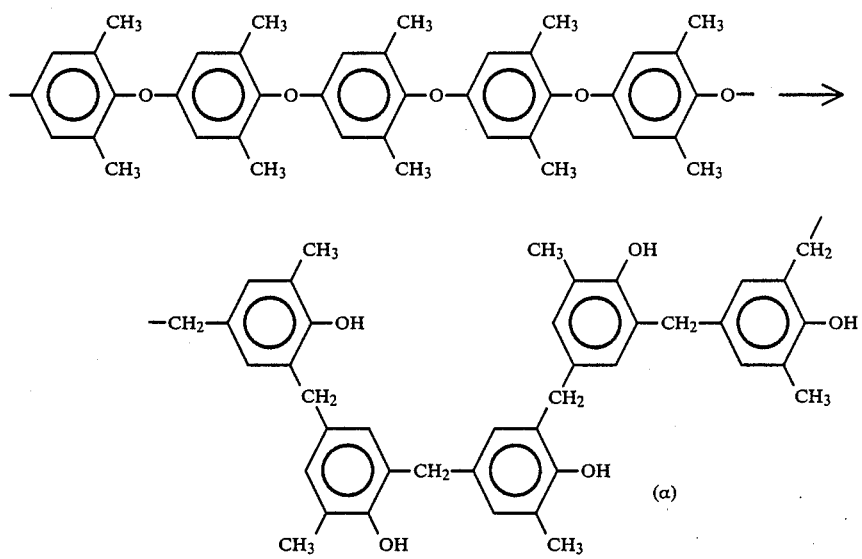

The phenols obtained as a decomposition product of a conventional polyphenylene ether by the reaction of Fries-type rearrangement, necessarily contain a methyl group at least at one of the 2-, 4- and 6-positions of the phenol ring.

On the other hand, a curable polyphenylene ether resin as described later to be employed for producing the cured polyphenylene ether resin according to the present invention has an alkenyl group and/or an alkynyl group bonded to the polyphenylene ether chain. With respect to these groups, a polymerization reaction occurs during the curing step of the curable polyphenylene ether resin, so that the polyphenylene ether chains are strongly bound together. Therefore, it is believed that the reaction of Fries-type rearrangement is hindered by the above-mentioned binding. Especially when substitution with at least one substituent selected from the group consisting of an alkenyl group and an alkynyl group occurs on a methyl group of the polyphenylene ether chain, the reaction of Fries-type rearrangement suffers direct hindrance from these functional groups. Therefore, with respect to the cured polyphenylene ether resin of the present invention, pyrolysis is believed to proceed for example, through the mechanism shown in formula ($\beta$) below, thereby forming 3,5-dimethylphenol.

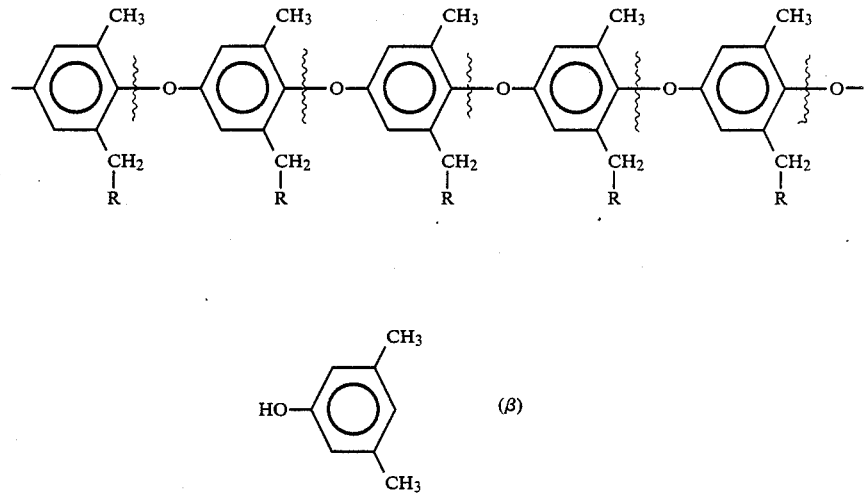

wherein R represents a hydrogen atom, an alkenyl group and/or an alkynyl group.

With respect to the amount of 3,5-dimethylphenol formed, it has been found that it is increased as the average substitution degree of the curable polyphenylene ether resin as described later is increased.

In the above-mentioned pyrolysis gas chromatography, a polyphenylene ether resin sample is heated until pyrolysis of the sample occurs, and the components of the decomposition product formed as a result of pyrolysis are analyzed by gas chromatography. The method of heating to be employed in pyrolysis gas chromatography is not critical. For example, such heating may be performed by any one of the filament heating method, furnace heating method, high frequency induction heating method and laser heating method. Of these methods, the high frequency induction heating method (for example, by means of Curie point pyrolyzer) is most preferred because not only is rapid heating feasible but also the obtained temperatures are accurate and highly reproducible.

Conditions for performing pyrolysis are not particularly limited. Generally, however, it is preferred that pyrolysis be performed in an inert gas atmosphere, at 500° C., for 4 sec. Under these conditions, conventional polyphenylene ethers are either little decomposed or undergo no decomposition at all. By contrast, in the cured polyphenylene ether resin of the present invention, the portions of alkenyl and/or alkynyl groups undergo thermal decomposition under these conditions, thereby inducing decomposition of the polyphenylene ether chains. Accordingly, these conditions are most preferred in the analysis of 3,5-dimethylphenol formed due to the incorporation of alkenyl and/or alkynyl groups into polyphenylene ether chains. It is preferred that helium and nitrogen gases be used as the inert gas, since these are also useful as a carrier gas in gas chromatography. Pyrolysis samples are preferably in powdery form, since it ensures high reproducibility.

Separation columns to be employed in the gas chromatography are not limited, as long as each of the aforementioned decomposition product components (a) to (e) can be completely separated. Generally, however, a nonpolar column of a methylsilicone or a column having about the same nonpolarity as that of a methylsilicone is most preferred. With respect to the type of a column, both a packed column and a capillary column can be used. Of these, the latter is preferred because it ensures excellent separation. Column temperature is not limited. However, it is generally preferred for shortening separation time that column temperature be elevated from about 50° C. at a rate of from 10° to 20° C. per min.

In gas chromatography (GC), a thermal conductivity type detector (TCD) and a flame ionization detector (FID) may be used as a detector. The GC may be connected to a mass spectrometer (MS) to permit joint use of these instruments. When only qualitative analysis is sufficient, a Fourier-transform infrared spectrometer (FT-IR) may be used in place of the above-mentioned detectors.

In the cured polyphenylene ether resin of the present invention, the chloroform extractable polyphenylene ether is present in an amount of from 0.01 to 20 % by weight, preferably from 0.01 to 10 % by weight, based on the weight of the resin. When the amount is less than 0.01 % by weight, the cured resin is disadvantageously brittle. On the other hand, when the amount exceeds 20 % by weight, the chemical resistance of the cured resin is poor.

The content (W %) of a chloroform extractable polyphenylene ether in the cured resin is obtained by weighing a resin sample (weight: $W_1$), immersing the sample in chloroform at 23° C. for 12 hours, taking out the sample from chloroform, removing the chloroform, weighing the resultant sample (weight: $W_2$), and calculating in accordance with the formula:

$$W = \frac{W_1 - W_2}{W_1} \times 100 \ (\%).$$

In the above formula, $W_1 - W_2$ means the amount of a chloroform extract. From the viewpoint of the facility in removing chloroform after immersion, it is preferred that the resin sample be in a film form or powdery form.

The chloroform extractable polyphenylene ether component of the cured polyphenylene ether resin of the present invention contains units of the formula:

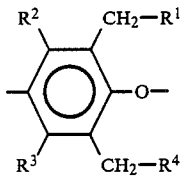

(I)

wherein $R^1$, $R^2$, $R^3$ and $R^4$ each independently represent a hydrogen atom, the above defined alkenyl group of formula (II) or the above defined alkynyl group of formula (III),
at least one of $R^1$, $R^2$, $R^3$ and $R^4$ being other than hydrogen, with the proviso that each unit is the same or different.

The average substitution degree as defined later of an alkenyl group and/or an alkynyl group with respect to the chloroform extractable polyphenylene ether is generally in the range of from 0.1 to 100 % by mole, as in the curable polyphenylene ether resin described below. In this connection, the average substitution degree of the chloroform extractable polyphenylene ether is not necessarily identical with that of the curable polyphenylene ether resin.

The viscosity number ($\eta sp/c$) of the chloroform extractable polyphenylene ether is generally in the range of from 0.05 to 1.0 as measured in a 0.5 g/dl chloroform solution of the chloroform extractable polyphenylene ether at 30° C.

The structure of the chloroform extract from the cured polyphenylene ether resin can be confirmed by nuclear magnetic resonance spectroscopy (NMR), infrared spectroscopy (IR), etc. Of these, NMR, especially $^1$H-NMR, is preferred.

Representative examples of alkenyl groups include an allyl group, a 2-methyl-2-propenyl group, a 2-butenyl group, a 3-butenyl group, a 3-methyl-2-butenyl group, a 4-methyl-3-pentenyl group, a 4-pentenyl group, and a 5-hexenyl group. Representative examples of alkynyl groups include a propargyl group, a 2-butynyl group, a 3-butynyl group, a 2-pentynyl group, a 3-pentynyl group, a 4-pentynyl group, a 3-hexynyl group and a 5-hexynyl group.

The cured polyphenylene ether resin of the present invention may preferably be produced by curing a curable polyphenylene ether resin as defined below. Accordingly, in another aspect of the present invention, there is provided a curable polyphenylene ether resin comprising at least one polyphenylene ether represented by the formula:

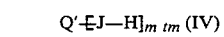

(IV)

wherein m is an integer of from 1 to 6, J is a polyphenylene ether chain comprising units of the formula:

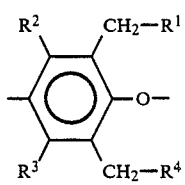

(I)

wherein $R^1$, $R^2$, $R^3$ and $R^4$ each independently represent a hydrogen atom, an alkenyl group represented by the formula:

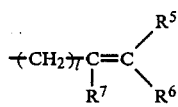

wherein l is an integer of from 1 to 4, and $R^5$, $R^6$ and $R^7$ each independently represent a hydrogen atom or a methyl group;

or an alkynyl group represented by the formula:

wherein k is an integer of from 1 to 4 and $R^8$ represents a hydrogen atom, a methyl group or an ethyl group, at least one of $R^1$, $R^2$, $R^3$, and $R^4$ being other than hydrogen, and Q' represents a hydrogen atom when m is 1, and Q' in each polyphenylene ether independently represents Q or Q substituted with at least one substituent selected from the group consisting of an alkenyl group as defined above and an alkynyl group as defined above when m is greater than 1, where Q represents the residue of a polyfunctional phenol having from 2 to 6 phenolic hydroxyl groups and has unpolymerizable substituents at the ortho and para positions with respect to the phenolic hydroxyl groups, with the proviso that each polyphenylene ether chain is the same or different.

The curable polyphenylene ether resin has an average substitution degree of alkenyl and alkynyl groups of from 0.1 to 100 % by mole as defined by the formula:

$$\frac{\text{total number of moles of alkenyl and alkynyl groups in the polyphenylene ether resin}}{\text{number of moles of phenyl groups in the polyphenylene ether resin}} \times 100\ (\%).$$

The ratio of the total number of moles of alkenyl and alkynyl groups to the number of moles of phenyl groups is determined in terms of the ratio of the total area of peaks attributed to the protons of alkenyl and alkynyl groups to the area of peak attributed to the protons of phenyl groups on a $^1$H-NMR spectrum of the curable polyphenylene ether resin.

In formula (I), as defined in formula (IV), $R^1$, $R^2$, $R^3$ and $R^4$ each independently represent a hydrogen atom, an alkenyl group, or an alkynyl group, with the proviso that at least one of $R^1$, $R^2$, $R^3$ and $R^4$ is other than hydrogen.

Representative examples of alkenyl groups include an allyl group, a 2-methyl-2-propenyl group, a 2-butenyl group, a 3-butenyl group, a 3-methyl-2-butenyl group, a 4-methyl-3-pentenyl group, a 4-pentenyl group, and a 5-hexenyl group. Representative examples of alkynyl groups include a propargyl group, a 2-butynyl group, a 3-butynyl group, a 2-pentynyl group, a 3-pentynyl group, a 4-pentynyl group, a 3-hexynyl group and a 5-hexynyl group.

As is apparent from the above-mentioned definition of the average substitution degree, the possible maximum value of the average substitution degree is 400 % by mole. From the viewpoint of attaining the objective of the present invention, however, it is necessary that the average substitution degree of the curable polyphenylene ether resin be in the range of from 0.1 to 100 % by mole. Preferably, the average substitution degree is in the range of from 0.5 to 50 % by mole. When the average substitution degree is less than 0.1 % by mole, the cured polyphenylene ether resin will not have the desired chemical resistance. On the other hand, when the average substitution degree exceeds 100 % by mole, the cured polyphenylene ether resin is disadvantageously brittle.

The presence of an alkenyl group and/or an alkynyl group can be confirmed by nuclear magnetic resonance spectroscopy (NMR), infrared spectroscopy (IR), etc. The above-mentioned average substitution degree can be determined in terms of the ratio of the total area of peaks attributed to the protons of alkenyl and alkynyl groups to the area of peak attributed to the protons of phenyl groups on a $^1$H-NMR spectrum of the curable polyphenylene ether resin.

From the viewpoint of attaining the objective of the present invention, it is necessary that the curable polyphenylene ether resin have viscosity number ($\eta$sp/c) of from 0.2 to 1.0 as measured in a 0.5 g/dl chloroform solution of the curable polyphenylene ether resin at 30° C. When the viscosity number is less than 0.2, the cured polyphenylene ether resin has poor mechanical properties. On the other hand, when the viscosity number exceeds 1.0, the softening temperature of the curable polyphenylene ether resin is disadvantageously high so that melt-molding of the polymer is difficult. Moreover, when a curable polyphenylene ether resin having a viscosity number of more than 1.0 is used in the form of a solution, the solution is likely to suffer undesirable gelation.

In the above-mentioned formula (IV), Q' represents a hydrogen atom when m is 1. When m is greater than 1, Q' Q' in each polyphenylene ether independently represents Q or Q substituted with at least one substituent selected from the group consisting of an alkenyl group of formula (II) and an alkynyl group of formula (III). Q is the residue of a polyfunctional phenol having from 2 to 6 phenolic hydroxyl groups and having unpolymerizable substituents at the ortho and para positions with respect to the phenolic hydroxyl groups. Representative examples of Q include residues represented by the following formulae (V) to (VIII):

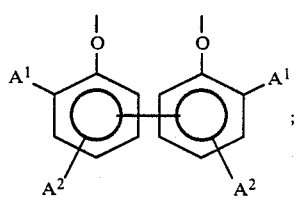

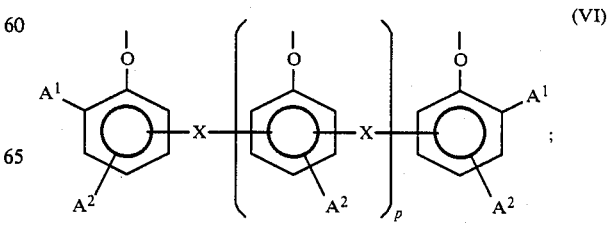

-continued

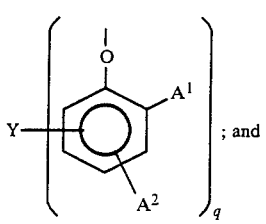 ; and (VII)

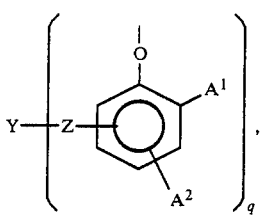 , (VIII)

Wherein $A^1$ and $A^2$ each independently represent a straight-chain alkyl group of 1 to 4 carbon atoms, X represents an unsubstituted or substituted aliphatic hydrocarbon group, an unsubstituted or substituted aralkyl group, an oxygen atom, a sulfur atom, a sulfonyl group or a carbonyl group; Y represents an unsubstituted or substituted aliphatic hydrocarbon group, an unsubstituted or substituted aromatic hydrocarbon group or an unsubstituted or substituted aralkyl group, Z represents an oxygen atom, a sulfur atom, a sulfonyl group or a carbonyl group; and the bonding line crossing the middle point of a side of the benzene ring, e.g.

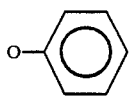

indicates bonding of a substituent at the ortho or para position of the benzene ring with respect to the phenolic hydroxyl group; and wherein p is an integer of 0 to 4 and q is an integer of 2 to 6.

Specific examples of Q include residues represented by the following formulae:

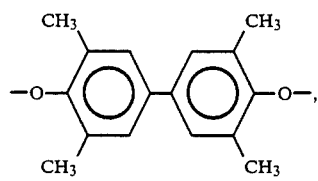

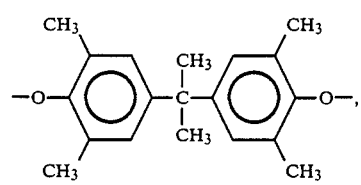

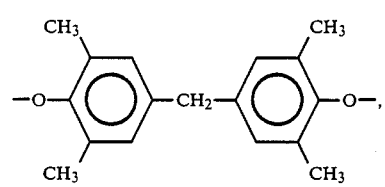

-continued

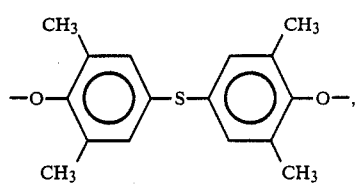

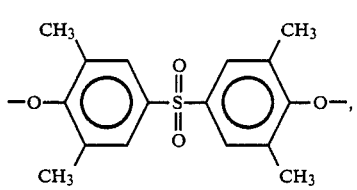

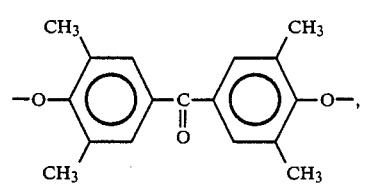

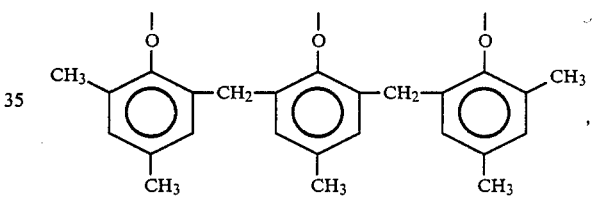

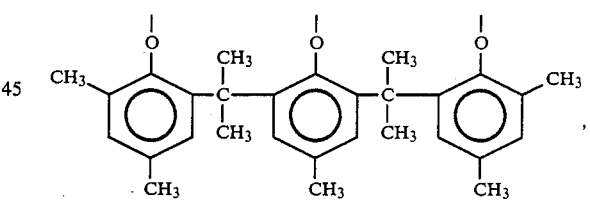

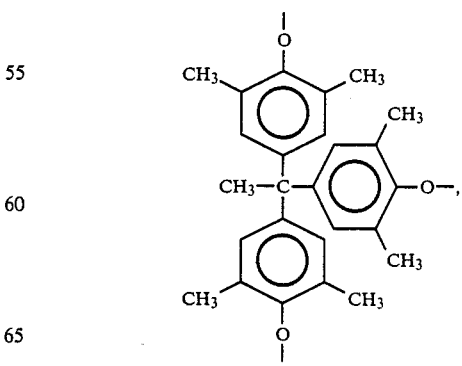

-continued

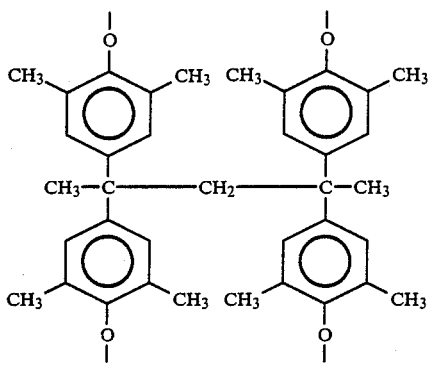

The curable polyphenylene ether resin of formula (IV) may be shaped or cured in a predetermined form prior to use in various application fields. The method for shaping is not limited. Generally, the shaping may be conducted by a conventional casting method in which the polyphenylene ether resin is dissolved in a solvent and shaped into a predetermined form, or a conventional heat-melting method in which the polyphenylene ether is melted by heating and then shaped into a predetermined form.

Representative examples of solvents which may be used in the casting method include halogenated hydrocarbons such as chloroform, trichloroethylene and dichloromethane; and aromatic hydrocarbons such as benzene, toluene and xylene. These solvents may be used individually or in combination. The curable polyphenylene ether resin may generally be dissolved in the solvent at a concentration of 1 to 50 % by weight. The form of the shaped article is not limited. Generally, the curable polyphenylene ether resin of the present invention may be shaped into a sheet or a film. For example, in the case of a film, the curable polyphenylene ether resin solution is coated or cast on a substrate such as a stainless steel plate, a glass plate, a polyimide film, a polyester film or a polyethylene film. The thickness of the polyphenylene ether solution coated or cast on the substrate is not limited and is generally determined according to the intended thickness of the resultant film and the polyphenylene ether resin concentration of the solution. After coating or casting, the solvent of the solution is removed by air drying, hot-air drying, vacuum drying or the like, to thereby form a film. The film thus formed is peeled off from the substrate. If desired, the film thus obtained may again be subjected to removal of the solvent remaining in the film. However, it is not always required to completely remove the solvent from the film. The removal of the solvent is conducted at a temperature which does not exceed the temperature which the substrate can stand. Generally, the removal of the solvent can be conducted at about 23° C. to about 150° C.

In the case of the heat-melting method, the shaping of the polyphenylene ether resin which has been melted by heating may be conducted by a customary melt-molding method such as injection molding, transfer molding, extrusion, press molding or the like. The melt-molding may generally be conducted at a temperature higher than the glass transition temperature of the curable polyphenylene ether resin but lower than the temperature at which the curable polyphenylene ether resin begins to cure.

As mentioned hereinbefore, the curable polyphenylene ether resin of the present invention has an alkenyl group and/or alkynyl group as a substituent. The glass transition temperature of the curable resin is decreased in proportion to the increase of the average substitution degree. Generally, a polyphenylene ether having no alkenyl group and/or alkynyl group (hereinafter often referred to as "unsubstituted polyphenylene ether") has a glass transition temperature of about 210° C. On the other hand, the curable polyphenylene ether resin of the present invention has a glass transition temperature of from about 140° C. to about 210° C., which is lower than that of the unsubstituted polyphenylene ether by several to 70° C., due to the presence of the alkenyl groups and/or alkynyl groups. Therefore, the curable polyphenylene ether resin of the present invention can easily be melt-molded as compared to the unsubstituted polyphenylene ether.

The temperature at which the curable polyphenylene ether resin of the present invention begins to cure may generally be about 250° C. to about 380° C. The curing reaction of the polyphenylene ether resin can be monitored by differential scanning calorimetry, infrared spectroscopy or the like.

The above-mentioned casting method and heat-melting method can be used individually. Alternatively, these methods may also be used in combination. For example, it is possible that polyphenylene ether resin films are obtained by the casting method and, then, several to several tens of films are piled up and fused with one another by the melt molding method such as press molding, to thereby obtain a polyphenylene ether resin sheet.

The curable polyphenylene ether resin of the present invention can be used alone. Alternatively, the curable polyphenylene ether resin of the present invention can be mixed with a filler and/or an additive in order to impart additional desired properties to the cured polyphenylene ether resin according to the intended use, as long as such a filler and additive do not adversely affect the properties of the cured polyphenylene ether resin. The filler can be in either fibrous form or powdery form. Representative examples of fillers include a carbon fiber, a glass fiber, a boron fiber, a ceramic fiber, an asbestos fiber, carbon black, silica, alumina, mica, a glass bead, a glass hollow sphere and the like. Representative examples of additives include an antioxidant, a thermal stabilizer, a fire retardant, an antistatic agent, a plasticizer, a pigment, a dye, a colorant and the like.

Further, at least one crosslinkable monomer may also be added to the curable polyphenylene ether resin of the present invention. Moreover, at least one of thermoplastic and thermosetting resins can also be added to the curable polyphenylene ether resin of the present invention.

The cured polyphenylene ether resin of the present invention can be produced by curing the curable polyphenylene ether resin of the present invention by heating, light exposure, electron beam exposure or the like. Of these, heating is most preferred. The curable polyphenylene ether resin can be cured after shaping into a predetermined form by a casting method or a melt-molding method.

The curable polyphenylene ether resin per se of the present invention may be subjected to curing without the use of a polymerization initiator. If it is desired to increase the chemical resistance of the resultant cured polyphenylene ether resin, or if it is desired to lower the curing temperature of the curable polyphenylene ether resin, a polymerization initiator may advantageously be used in curing the curable polyphenylene ether resin. As a polymerization initiator, there may advantageously be employed a radical polymerization initiator, which can suitably be chosen taking into consideration the decomposition temperature of the radical polymerization initiator and the desired curing temperature to be employed. Both peroxide initiators and non-peroxide initiators can be used in the present invention. Representative examples of radical polymerization peroxide initiators include peroxides such as cumene hydroperoxide, 2,5-dimethylhexane-2,5-dihydroperoxide, 2,5-dimethyl-2,5-di(t-butylperoxy)hexyne-3, di-t-butyl peroxide, t-butylcumyl peroxide, α,α′-bis(t-butylperoxy-m-isopropyl)benzene, 2,5-dimethyl-2,5-di(t-butylperoxy)-hexane, dicumyl peroxide, di-t-butylperoxy isophthalate, t-butylperoxy benzoate, 2,2-bis(t-butylperoxy)butane, 2,2-bis(t-butylperoxy)octane, 2,5-dimethyl-2,5-di(-benzoylperoxy) hexane, di(trimethylsilyl)peroxide and trimethylsilyltriphenylsilyl peroxide and the like. Representative examples of non-peroxide initiators include 2,3-di-methyl-2,3-diphenylbutane and the like. But the radical polymerization initiators which can be used for curing the curable polyphenylene ether resin of the present invention are not to be limited to those mentioned above.

The amount of the polymerization initiator to be used can generally be 0.01 to 10 parts by weight, preferably 0.1 to 5 parts by weight relative to 100 parts by weight of the curable polyphenylene ether resin. When the amount of the polymerization initiator is lower than 0.01 part by weight, an increase in crosslink density cannot be attained. On the other hand, when the amount of the polymerization initiator is larger than 10 parts by weight, the initiator undesirably remains in the resultant cured polyphenylene ether resin after curing, and the cured polyphenylene ether resin becomes brittle.

In the case of the casting method, the polymerization initiator can be added to a solvent together with the curable polyphenylene ether resin. On the other hand, in the case of the melt-molding method, the polymerization initiator can be added to the curable polyphenylene ether resin just before melting the curable polyphenylene ether resin by heating.

The temperature which can be employed for curing the curable polyphenylene ether resin is not limited. When the curable polyphenylene ether resin is subjected to curing without using any polymerization initiator, curing will generally be conducted at a temperature of about 260° C. to about 350° C. On the other hand, when a polymerization initiator is used in combination, curing will generally be conducted at a temperature in the same range as mentioned above, and it is also possible to conduct curing at a temperature lower than the abovementioned range, for example, about 140° C., depending on the decomposition temperature of the polymerization initiator employed.

The curing period of time should also not be limited. Generally, the curing may be conducted for about 1 minute to about 3 hours, preferably about 1 minute to about 1 hour.

The curable polyphenylene ether resin of the present invention may be produced, for example, by either of the following methods (1) and (2).

Method (1) comprises:
reacting at least one polyphenylene ether represented by the following formula (IX):

$$Q-[J'-H]_m \quad \text{(IX)}$$

wherein m is an integer of from 1 to 6, J' is a polyphenylene ether chain comprising units of the formula:

and Q represents a hydrogen atom when m is 1, and represents the residue of a polyfunctional phenol having 2 to 6 phenolic hydroxyl groups and having unpolymerizable substituents at the ortho and para positions with respect to the phenolic hydroxyl groups when m is greater than 1, with an organometallic compound to metalate the polyphenylene ether; and
reacting the metalated polyphenylene ether with an alkenyl halide represented by the following formula (XI):

wherein l is an integer of 1 to 4; L is a chlorine atom, a bromine atom or an iodine atom; and $R^5$, $R^6$ and $R^7$ each independently represent a hydrogen atom or a methyl group, and/or an alkynyl halide represented by the following formula (XII):

$$L-(CH_2)_k C \equiv C-R^8 \quad \text{(XII)}$$

wherein k is an integer of 1 to 4; L is a chlorine atom, a bromine atom or an iodine atom; and $R^8$ is a hydrogen atom, a methyl group or an ethyl group, to thereby substitute the metal atom of the metalated polyphenylene ether with an alkenyl group and/or alkynyl group.

Method (2) comprises:
adding halogen atoms to the double bond of the alkenyl group of at least one alkenyl group-substituted polyphenylene ether represented by the formula (XIII):

$$Q''-[J''-H]_m \quad \text{(XIII)}$$

wherein m is an integer of from 1 to 6, J'' is a polyphenylene ether chain comprising units of the formula:

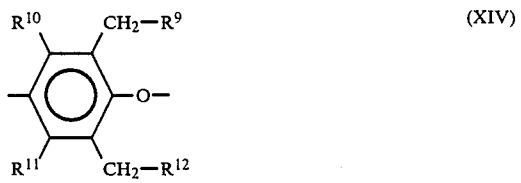

wherein $R^9$, $R^{10}$, $R^{11}$ and $R^{12}$ each independently represent a hydrogen atom, an alkenyl group represented by the formula:

 (XV)

wherein j is an integer of 1 to 4, and $R^8$ is a hydrogen atom, a methyl group or an ethyl group,
at least one of $R^9$, $R^{10}$, $R^{11}$ and $R^{12}$ being other than hydrogen, and Q″ represents a hydrogen atom when m is 1, and Q″ in each polyphenylene ether independently represents Q or Q substituted with at least one substituent selected from the group consisting of an alkenyl group as defined by the formula (XV) when m is greater than 1;
where Q represents the residue of a polyfunctional phenol having 2 to 6 phenolic hydroxyl groups and having unpolymerizable substituents at the ortho and para positions with respect to the phenolic hydroxyl groups when m is greater than 1, and
reacting the halogen atom-added polyphenylene ether with a metal amide to thereby effect dehydrohalogenation.

Representative examples of polyfunctional phenol residues in the polyphenylene ether of formula (IX) to be used in the production method (1) include residues represented by the above-mentioned formulae (V) to (VIII). With respect to the method for producing the polyphenylene ether of formula (IX), there is no particular limitation. For example, the polyphenylene ether of formula (IX) can be produced by oxidative polymerization of 2,6-dimethylphenol alone. Alternatively, the polyphenylene ether of formula (IX) can be produced by oxidative polymerization of 2,6-dimethylphenol in the presence of the above-mentioned polyfunctional phenol residue according to the method disclosed in Japanese Patent Application Publication Specification Nos. 55-40615 and 55-40616. The polyphenylene ether of formula (IX) can be an oligomer or a high polymer, but it is preferable to employ a polyphenylene ether having a viscosity number ($\eta sp/c$) in the range of from 0.2 to 1.0 as measured in 0.5 g/dl chloroform solution of the polyphenylene ether at 30° C.

Representative examples of organometallic compounds to be used in the production method (1) include an alkyl lithium such as methyl lithium, n-butyl lithium, sec-butyl lithium and tert-butyl lithium; phenyl lithium; and an alkyl sodium.

The alkenyl halide of formula (XI) and the alkynyl halide of formula (XII) to be used in the production method (1) are halides respectively of the above-mentioned alkenyl group of formula (II) and alkynyl group of formula (III). Preferred examples of halogens of the halides include chlorine, bromine and iodine. The reactions in the production method (1) are performed in a solvent. Representative examples of solvents include an ether type solvent such as tetrahydrofuran (hereinafter referred to as THF), 1,4-dioxane and dimethoxyethane (hereinafter referred to as DME). Alternatively, the reactions can be performed in a hydrocarbon type solvent such as cyclohexane, benzene, toluene and xylene, in the presence of N,N,N′,N′-tetramethylethylenediamine (hereinafter referred to as TMEDA). Prior to use for the reactions, these solvents are preferably subjected to preliminary treatment such as purification and dehydration. These solvents can be used individually or in combination in appropriate proportions. Further, these solvents can be used together with a solvent other than those mentioned above as long as it does not inhibit the reactions. It is preferred that the reactions be performed under an atmosphere of an inert gas, such as nitrogen, argon, etc.

With respect to the alkenyl halides and alkynyl halides, these can be used individually or in combination. When these are used in combination, a combination of the alkenyl halides, a combination of the alkynyl halides or a combination of the alkenyl halide and the alkynyl halide can be used. In the case where the halides are employed in combination, the order of addition of the halides to the reaction system is not limited. The halides can also be mixed with each other prior to addition to the reaction system.

There is no particular limitation with respect to the temperature and the period of time of the metalation reaction and the alkenyl and/or alkynyl substitution reaction. The metalation reaction and the alkenyl and/or alkynyl substitution reaction are generally performed at a temperature of from $-78°$ C. to a temperature lower than the boiling point of the reaction system (in case the reaction system is frozen at a temperature higher than $-78°$ C., the reactions are performed at a temperature of from a temperature higher than the freezing point of the reaction system to a temperature lower than the boiling point of the reaction system), preferably in the range of from 5° C. to a temperature lower than the boiling point of the reaction system. The reaction time for metalation is generally from 1 second to 50 hours, preferably from 1 minute to 10 hours. The reaction time for alkenyl and/or alkynyl substitution is generally from 1 second to 50 hours, preferably from 1 minute to 10 hours.

By the production method (1) as described above, the methyl group at the 2- and/or 6-position of the phenyl group and/or a hydrogen atom at the 3-and/or 5-position of the phenyl group of the polyphenylene ether chain can be substituted with the alkenyl group and/or alkynyl group. Further, the phenyl group and the alkyl group as an unpolymerizable substituent in the polyfunctional phenol residues represented by Q can also be substituted with the alkenyl group and/or alkynyl group. The factors determining the position where substitution with the alkenyl and/or alkynyl occurs include the temperature of the reaction system, the reaction time and the type of the solvent. The factors determining the substitution degree include the temperature of the reaction system, the reaction time, the type of the solvent, the amount of the organometallic compound to be used for metalation and the amounts of the alkenyl halide and/or alkynyl halide to be used. The substitution degree can be controlled by regulating any of the above-mentioned factors. However, the desired substitution degree can be obtained by controlling the amount of the organometallic compound within the range of 0.001 to 5 mole per mole of the phenyl group, and controlling the amount of the alkenyl halide and/or alkynyl halide within the range of 1 to 3 equivalents relative to the above-controlled amount of the organometallic compound. Alternatively, the desired substitution degree can be obtained by using the organometallic compound in an excess amount, such as 1 to 3 equivalents relative to the amount of the alkenyl halide and/or alkynyl halide, and controlling the amount of the halide within the range of 0.001 to 5 mole per mole of the phenyl group.

Representative examples of polyfunctional phenol residues in the alkenyl substituted-polyphenylene ether (XIII) to be used in the production method (2) include residues represented by the above-mentioned formulae (V) to (VIII).

Representative examples of alkenyl groups include allyl group, 2-butenyl group, 3-butenyl group, 2-pentenyl group, 3-pentenyl group, 4-pentenyl group, 3-hexenyl group, 4-hexenyl group and 5-hexenyl group.

The polyphenylene ether of formula (XIII) may be an oligomer or a high polymer, but it is preferable to employ a polyphenylenylene ether having a viscosity number ($\eta sp/c$) in the range of from 0.2 to 1.0 as measured in a 0.5 g/dl chloroform solution of the polyphenylene ether at 30° C.

As the halogen to be added to the double bond of the alkenyl group, there may be mentioned, for example, chlorine and bromine. The halogen addition reaction is performed in a solvent. Representative examples of solvents to be used in the addition reaction in the production method (2) include a halogen-substituted hydrocarbon compound such as chloroform, dichloromethane, 1,2-dichloroethane and 1,1,2,2-tetrachloroethane, and carbon disulfide. The metal amide to be used in the dehydrohalogenation reaction in the production method (2) is a compound represented by the formula RR' NM wherein R and R' each independently represent a hydrogen atom, an aliphatic hydrocarbon group having 1 to 6 carbon atoms, a trimethylsilyl group and the like, N represents a nitrogen atom and M is lithium or sodium. Representative examples of metal amides include lithium amide, sodium amide, lithium diethylamide, lithium diisopropylamide, lithium dicyclohexylamide, lithium bis(trimethylsilyl)amide. The dehydrohalogenation reaction is performed in a solvent. Representative examples of solvents to be used in the dehydrohalogenation reaction include ether type solvents such as THF, 1,4-dioxane, and DME, and aromatic hydrocarbon type solvents such as benzene, toluene and xylene.

All of the double bonds of the alkenyl groups of the polyphenylene ether of formula (XIII) can be reacted with a halogen, or part of the double bonds can remain unreacted. The ratio of the double bonds reacting with a halogen can be controlled by regulating the amount of halogen used. There is no particular limitation with respect to the amount of halogen to be used. However, the amount of halogen is generally 0.1 to 2 mole per mole of the alkenyl group. It is preferred that a metal amide be used in an amount of 2 to 10 equivalents per equivalent of the halogen added to the double bonds.

There is no particular limitation with respect to the temperature and time for the halogen addition reaction and the dehydrohalogenation reaction using a metal amide. The halogen addition reaction is preferably performed at a temperature of from $-78°$ C. (or a temperature higher than the freezing point of the reaction system) to a temperature lower than the boiling point of the reaction system, more preferably from $-78°$ C. (or a temperature higher than the freezing point of the reaction system) to 30° C., for about 1 minute to about 5 hours. The dehydrohalogenation reaction is preferably performed at a temperature of from $-78°$ C. (or a temperature higher than the freezing point of the reaction system) to a temperature lower than the boiling point of the reaction system, more preferably from $-78°$ C. (or a temperature higher than the freezing point of the reaction system) to 30° C., for about 1 minute to about 5 hours.

In the halogen addition reaction and the dehydrohalogenation reaction, there is no change in the substitution position and the average substitution degree of the alkenyl group. Therefore, the substitution position and the average substitution degree of the alkenyl group of the curable polyphenylene ether resin of formula (IV) directly reflect those of the starting polyphenylene ether of formula (XIII).

In the curable polyphenylene ether resin of the present invention, the molecular motion is activated due to the introduction of the alkenyl group and/or alkynyl group. Therefore, the glass transition temperature of the resin is lowered as the average substitution degree is increased. According to this, the glass transition temperature of the curable polyphenylene ether resin of the present invention is in the range of about 140° C. to about 210° C. while the curing temperature is in the range of 250° C. to 380° C. so that the resin can easily be melt-molded. Further, since a substituent having an appropriate size is introduced to a polyphenylene ether having a relatively large molecular weight in an appropriate amount, excellent mechanical properties inherent in the polyphenylene ether is not impaired. Still further, the substituent in the present invention is not a polar group so that the desired electrical properties of polyphenylene ether, such as a low dielectric constant and a low dielectric dissipation factor are almost not impaired. In the present invention, the entanglement of molecules is increased due to the introduction of the substituent so that the film-forming ability is improved, and therefore, the curable polyphenylene ether resin of the present invention can be shaped by a casting method using a solvent. On the other hand, conventional polyphenylene ethers have almost no film-forming ability, and hence, it is difficult to shape conventional polyphenylene ethers by a casting method.

In the cured polyphenylene ether resin of the present invention, the molecular motion is markedly surpressed due to the curing reaction of the alkenyl group and/or alkynyl group. This advantageously results in an increase in glass transition temperature, a marked decrease in the linear expansion coefficient at a temperature higher than the glass transition temperature, and an insolubilization in solvents for the starting unsubstituted polyphenylene ethers, such as aromatic hydrocarbon solvents and halogen-substituted hydrocarbon solvents.

Since the curing reaction is of an addition reaction type, formation of water as in a condensation reaction does not occur at all, thereby enabling a cured product having no voids to be produced. Therefore, the during reaction does not cause a decrease in volume of polymer. According to the present invention, the properties inherent in the starting unsubstituted polyphenylene ether, such as excellent desired dielectric properties and mechanical properties, are maintained through control of the average substitution degree in the introduction of the alkenyl group and/or alkynyl group and control of the curing degree in the curing reaction.

The cured polyphenylene ether resin of the present invention has excellent heat resistance and chemical resistance because of the cured structure formed by the alkenyl group and/or alkynyl group. The cured polyphenylene ether resin of the present invention has a glass transition temperature of about 220° C. to more than about 300° C. which is higher than the glass transition temperature of the starting polyphenylene ether, by about 10 ° C to more than 100° C. depending upon the curing degree of the cured resin. This means that the cured polyphenylene ether resin of the present invention is useful as a material in the electronics field which is required to have an extremely high heat resistance, because a material for the field of electronics is necessarily exposed to high temperatures in soldering. In the present invention, even when the substitution degree is only about 5 %, the glass transition temperature of the cured polyphenylene ether resin can advantageously be increased to about 260° C. Moreover, the cured polyphenylene ether resin of the present invention is insoluble in aliphatic hydrocarbons and halogen-substituted hydrocarbons, differing from the starting polyphenylene ethers which are soluble in these solvents. Therefore, the cured polyphenylene ether of the present invention can advantageously be employed for various practical applications.

The cured polyphenylene ether resin of the present invention maintains most of the excellent desired electrical properties of the starting polyphenylene ether, such as a low dielectric constant and a low dielectric dissipation factor. Therefore, the present cured resin is extremely promising as a low dielectric constant material and can advantageously be employed as a material for various applications in the field of electronics.

The cured polyphenylene ether resin of the present invention is excellent in mechanical properties because a plasticizer is not used in melt-molding the curable polyphenylene ether. The cured polyphenylene ether resin has a tensile strength at break as high as 700 to 800 kg/cm2 as compared to the cured copolymer disclosed in Example 7 of U.S. Pat. No. 3,422,062, which has a tensile strength at break of only about 28 kg/cm$^2$.

Curing due to the alkenyl groups and/or alkynyl groups is of an addition reaction type. Therefore, in curing the curable polyphenylene ether resin of the present invention, byproducts such as water and gas, which are generated in curing a polyimide, are not formed, providing various advantages in the use of the cured polyphenylene ether. That is, the cured polyphenylene ether resin can provide films, sheets and other articles having no voids.

The curable polyphenylene ether resin of the present invention can readily be melt-molded. That is, the glass transition temperature of the curable polyphenylene ether resin is decreased to a range of from 140° to 210° C. by virtue of the introduction of specific alkenyl groups and/or specific alkynyl groups as defined in the present invention. On the other hand, the temperature at which the curable polyphenylene ether resin begins to cure is in the range of from 250° to 380° C. Therefore, the curable polyphenylene ether resin is not cured in the course of melt-molding, thereby enabling the curable polyphenylene ether resin to be readily melt-molded. In other words, the curable polyphenylene resin can be melt-molded without the aid of any plasticizer.

The curable polyphenylene ether resin of the present invention has a film forming capability improved by the introduction of an alkenyl group and/or an alkynyl group, thereby enabling the polyphenylene ether resin to be readily shaped by a casting method in which a solvent is used, differing from a conventional unsubstituted polyphenylene ether which is extremely poor in film forming capability.

The curable polyphenylene ether resin of the present invention maintains excellent desired electrical properties inherent in the starting unsubstituted polyphenylene ether such as a low dielectric constant and a low dielectric dissipation factor, because the substituents of the curable polyphenylene ether resin have no polarity.

The curable polyphenylene ether resin of the present invention can provide a cured polyphenylene ether resin having excellent mechanical properties, because the curable polyphenylene ether resin can be melt-molded in the absence of a plasticizer.

The curable polyphenylene ether resin of the present invention has excellent storage stability, because the temperature for crosslinking of the alkenyl groups and/or an alkynyl groups in the curable polyphenylene ether resin is in a relatively high temperature range, that is, 250° to 380° C. Therefore, the curable polyphenylene ether resin can advantageously be stored for a prolonged period of time.

The cured polyphenylene ether resin and curable polyphenylene ether resin of the present invention are advantageously used as a material for a printed circuit board substrate having a low dielectric constant. Examples of substrates include a substrate for a single-side printed circuit board, a substrate for a double-side printed circuit board, a multilayer board, a substrate for flexible printed circuit board and a substrate for a molded wiring board. The resin of the present invention can also be used as materials for a substrate for an antenna for satellite broadcasting, a microwave oven, an insulating film for very large scale integration circuit (VLSI), a heat resistant adhesive and the like.

[EXAMPLES]

Hereinafter, the present invention will be described in more detail with reference to Examples, which should not be construed as limiting the scope of the present invention.

EXAMPLES 1 TO 9

Syntheses of curable polyphenylene ether resins

In Example 1, using 2,2- bis(3,5-dimethyl-4-hydroxyphenyl) propane as a polyfunctional phenol compound, 2,6-dimethylphenol was subjected to oxidative polymerization, thereby obtaining a bifunctional polyphenylene ether (hereinafter referred to as PPE-1). 2.0 g of the above-obtained polyphenylene ether was dissolved in 100 ml of THF. Then, 1.1 ml of a 1.6 mol/l n-butyl lithium solution in hexane was added, and heated under reflux for 1 hour under a stream of nitrogen gas. After cooling to 23° C., 0.20 g of allyl bromide was added, and stirred at 23°C. for 30 min. Then, the mixture was poured into a large volume of methanol, thereby precipitating a polymer. The polymer was filtered off and washed with methanol three times. The washed polymer was dried under vacuum at 60° C. for 12 hours, thereby obtaining a white powdery polymer.

In Examples 2 to 7, using PPE-1, substantially the same procedure as in Example 1 was repeated except that various amounts of n-butyl lithium and allyl bromide as indicated in Table 1 were used.

Further, in Examples 8 to 9, using poly-2,6-dimethyl-1,4-phenylene ether having a viscosity number ($\eta sp/C$) of 0.91 as measured in a 0.5 g/dl chloroform solution at 30.0° C. (hereinafter referred to as PPE-2) and using a trifunctional polyphenylene ether obtained by oxidative polymerization of 2,6-dimethylphenol using 1,1,1-tris(3,5-dimethyl-4-hydroxyphenyl)ethane; as a polyfunctional phenol compound (hereinafter referred to as PPE-3), respectively, substantially the same procedures as in Example 1 were repeated.

Figure 2:
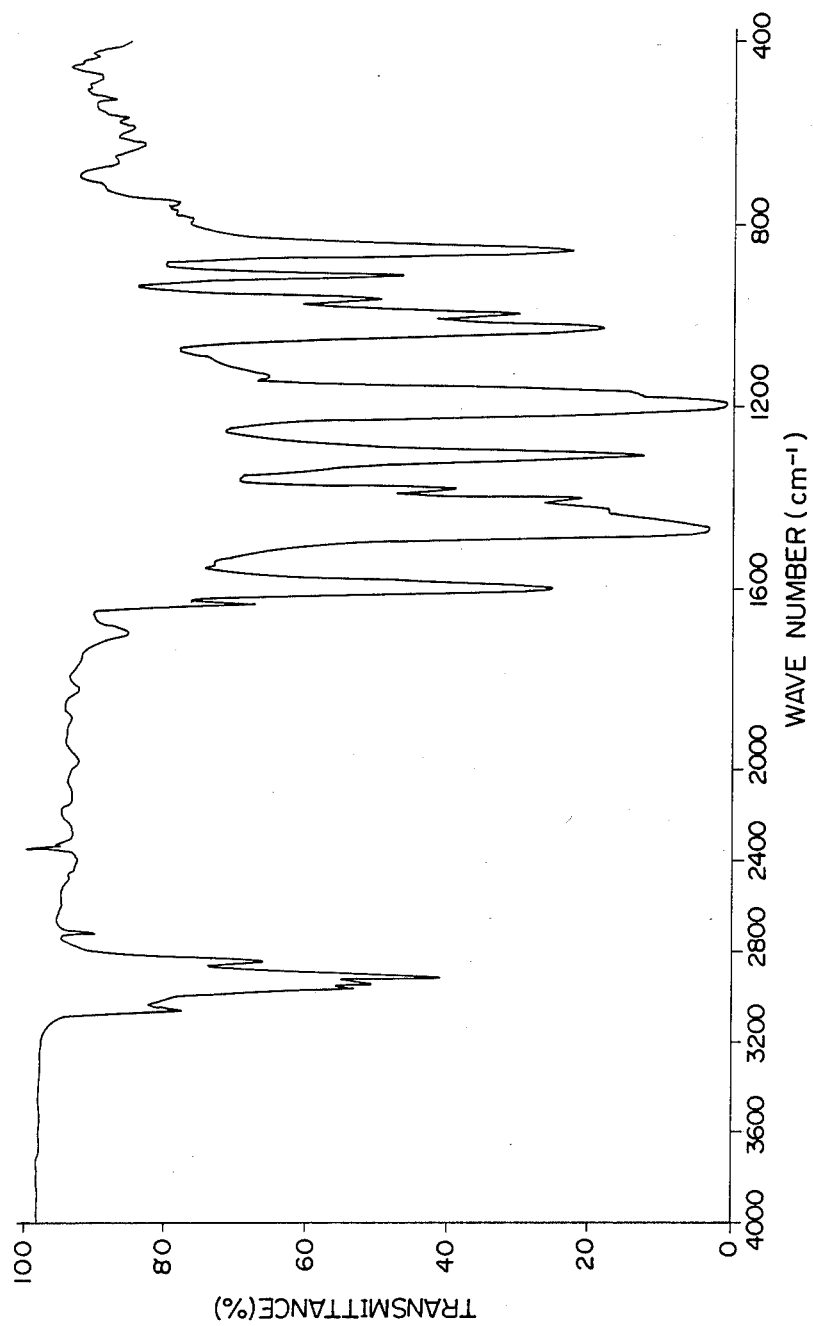
FIG. 2 is the infrared (IR) spectrum of a curable polyphenylene ether resin of the present invention obtained in Example 6.

With respect to each of the thus obtained polymers, the viscosity number (ηsp/C), the substitution degree of an allyl group and the glass transition temperature were measured. The results are shown in Table 1. The viscosity number was measured with respect to a 0.5 g/dl chloroform solution of the polymer at 30.0° C. The average substitution degree of an allyl group was determined in terms of the ratio of the total area of peaks attributed to the protons of allyl groups to the area of peak attributed to the protons of phenyl groups on a $^1$H-NMR spectrum of the curable polyphenylene ether resin. With respect to the polymer of Example 6, the $^1$H-NMR spectrum (CDCl$_3$ solution) is shown in FIG. 1, and the IR spectrum (diffuse reflectance method) is shown in FIG. 2. The spectrum of FIG. 2 shows the following characteristic peaks:

(1) $\nu$s, $\nu$as CH$_3$, CH$_2$ (2976—2860 cm$^{-1}$),
(2) $\nu$s C=C (1601 cm$^{-1}$),
(3) $\delta$as, $\delta$s CH$_3$ (1466—1381 cm$^{-1}$), $\nu$s C=C
(4) $\nu$as O—C (1194 cm$^{-1}$),
(5) $\delta$ (out-of-plane vibration) C—H (997 cm$^{-1}$), and
(6) $\delta$ (out-of-plane vibration) C—H (912 cm$^{-1}$).

Figure 3:
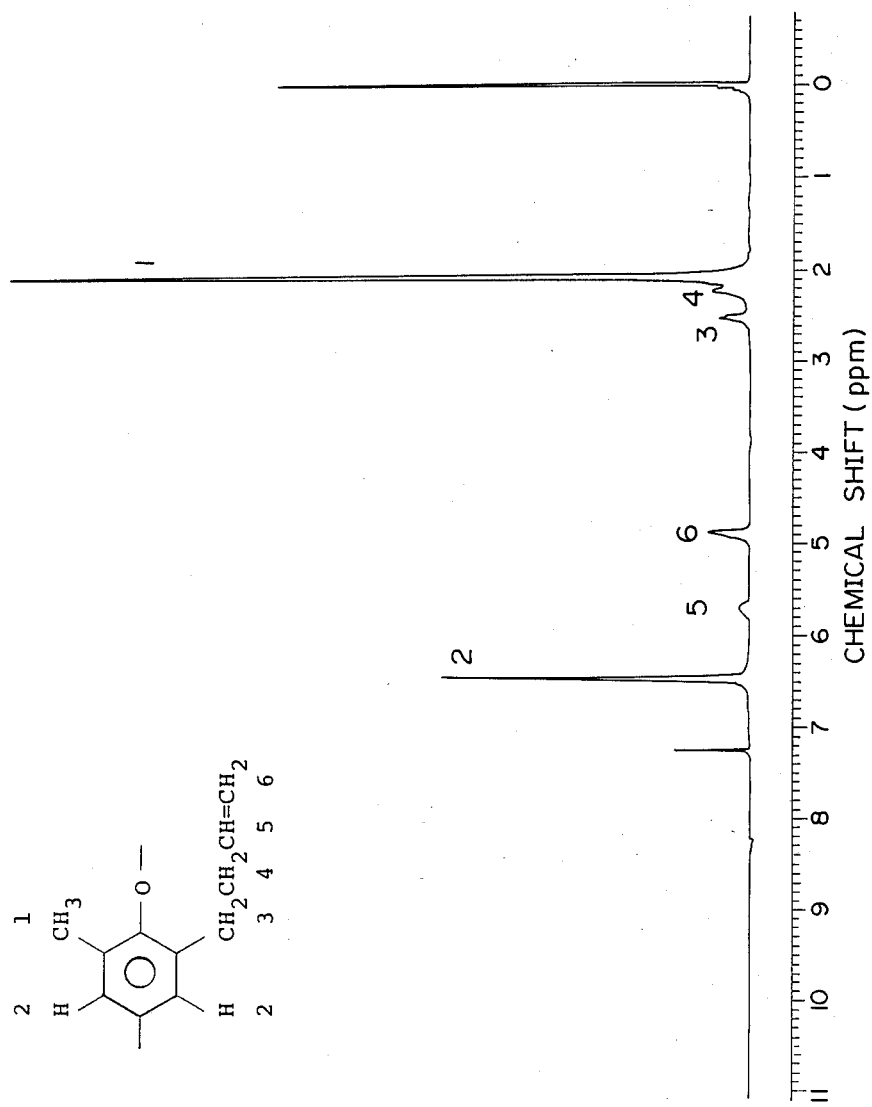
FIG. 3 is the $^1$H-NMR spectrum of a curable polyphenylene ether of the present invention obtained in Example 8.

The $^1$H-NMR spectrum (CDCl$_3$ solution) of the polymer of Example 8 is shown in FIG. 3. With respect to each of the powdery polymers prepared in Examples 1 to 9, the polymer was allowed to stand at 23° C. for 6 months, and a dissolution test in chloroform was conducted. All of the polymers were dissolved completely, and the resultant solutions were clear. No gel was observed.

In the measurement of glass transition temperature, a film having a thickness of about 100 μm was prepared by a casting method, and the glass transition temperature was measured by means of a thermomechanical analyzer (hereinafter referred to as TMA). In the above-mentioned casting method, 0.45 g of each polymer was dissolved in about 10 ml of chloroform. The resultant solution was put in a glass-made petri dish with flat bottom having a diameter of 70 mm and allowed to stand at 23° C. for 12 hours. The thus formed film was peeled off from the petri dish and dried under vacuum at 100° C. for 4 hours, to thereby obtain a film having a thickness of about 100 μm.

Thermal curing of curable polyphenylene ether resins

The film having a thickness of about 100 μm prepared by a casting method was fixed onto a glass plate with a pressure-sensitive adhesive tape, and heated at 280° C. for 30 min in an air oven.

The thus cured film was subjected to measurements of the chloroform extract amount, the glass transition temperature and the linear expansion coefficient (from 23° C. to Tg: $\alpha_1$, higher than Tg: $\alpha_2$). The chloroform extract amount was determined by measuring the weight decrease after immersion in chloroform at 23° C. for 12 hours. Tg, $\alpha_1$ and $\alpha_2$ were measured by means of TMA.

In each of Examples 6 and 7, a sheet having a thickness of 2 mm was prepared from a powdery sample by the use of a vacuum pressing machine at 240° C. for 1 hour. The sheet was subjected to thermal curing in the vacuum pressing machine at 280° C. for 30 min.

In Examples other than Examples 6 and 7, 20 cast films each having a thickness of 100 μm were piled up and subjected to press molding and thermal curing by the use of a vacuum pressing machine as mentioned above, to thereby obtain a cured sheet having a thickness of 2 mm.

The thus obtained sheets were subjected to measurements of the dielectric constant ($\epsilon_r$) and the dielectric dissipation factor (tan$\delta$) at 1 MHz.

Further, a portion of each sheet was reduced to powder and subjected to pyrolysis gas chromatography analysis, thereby determining the amount of 3,5dimethylphenol formed. Pyrolysis gas chromatography was performed under the following conditions.

(Apparatus for pyrolysis)
Curie point pyrolyzer JHP-3S (manufactured by Japan Analytical Industry Co., Ltd., Japan)
Temperature of the oven: 300° C.
Pyrolysis conditions: 500° C., 4 second
(Gas chromatography)
Gas Chromatograph 5890A (manufactured by Hewlett Packard, U.S.A.)
Column: DB-1 (manufactured by J & W, U.S.A.) of 0.25 mm in inside diameter x 30 m in length
Temperature of column: from 50° C., increased at a rate of 10° C./min
Carrier gas: He
Detector: FID
(Retention time)

| | |
|---|---|
| 2-methylphenol (a) | 6.9 min |
| 2,6-dimethylphenol (b) | 7.7 min |
| 2,4-dimethylphenol (c) | 8.4 min |
| 3,5-dimethylphenol (d) | 8.7 min |
| 2,4,6-trimethylphenol (e) | 9.3 min |

$$\text{Ratio of 3,5-dimethylphenol formed} = \frac{D}{A+B+C+D+E} \times 100(\%)$$

wherein A, B, C, D and E represent the areas of peaks on a pyrolysis gas chromatogram attributed to the components (a), (b), (c), (d) and (e), respectively.

The results are shown in Table 2.

Further, the following analysis was conducted to confirm the structure of each of the cured polyphenylene ether resins.

First, a pulverized cured polyphenylene ether resin was subjected to infrared spectroscopic analysis by Fourier-transform spectroscopy (diffuse reflectance method). As a result, a skeleton of polyphenylene ether was confirmed in all of the cured polyphenylene ether resins. Next, each of the abovementioned pulverized cured polyphenylene ether resins was immersed in deuterated chloroform (CDCl$_3$) at 23° C. for 12 hours, thereby extracting an uncured component. The extract was subjected to $^1$H-NMR analysis. The presence of a polyphenylene ether chain and an allyl group was confirmed in Example 1 to 9. The spectrum of the chloroform extract was well in agreement, in chemical shift, with that of the curable polyphenylene ether resin before curing.

In Example 2, the viscosity number ($\eta_{sp}/c$) of the chloroform extracted polyphenylene ether was 0.15. In Example 3, the viscosity number ($\eta_{sp}/c$) of the chloroform extracted polyphenylene ether was 0.12.

COMPARATIVE EXAMPLES 1 TO 4

According to the method as described in Example 1, allyl groups were introduced into PPE-1 so that the allyl group content became 0.05 %. The resultant PPE-1 was subjected to thermal curing at 280° C. for 30 min. After completion of the curing, the thus cured polyphenylene ether resin was subjected to measurements of physical properties (Comparative Example 1).

Next, according to the method as described in Example 1, it was tried to form PPE-1 into a film at 23° C. Many small cracks occurred, and it was impossible to obtain a film. In order to obtain a film having a sufficient mechanical properties, it was necessary that the film was formed while heating at about 60° C. However, in this method, the film failed to have plain surface and uniform thickness. With respect to the uncured film and the cured film obtained by heating the uncured film at 280° C for 30 min according to the method as described in Example 1, physical properties were measured (Comparative Examples 2 to 3). PPE-2 also could not be formed into a film at 23° C. A film of PPE-2 was formed at about 60° C. The resultant film was subjected to heat treatment according to substantially the same manner as mentioned above. The thus obtained PPE-2 film was subjected to measurements of physical properties (Comparative Example 4). The results are shown in Table 2.

In all of the films, the effect of allyl groups was absent or insufficient. That is, in contrast with the resins of the Examples, the chloroform extract amount was large, meaning that the chemical resistance was not sufficiently improved. In Comparative Example 2, improvement of heat resistance was not observed at all.

COMPARATIVE EXAMPLE 5

The same curable polyphenylene ether resin as employed in Example 7 was cured by heating at 320° C for 1 hr. The thus cured polyphenylene ether resin exhibited a chloroform extraction amount of 0 %. The resin was very brittle, and hence was not suited for actual use.

TABLE 1

| | PPE Q | Solvent | n-BuLi [1.6 M] | Alkenyl halide | | Reaction conditions | $\eta sp/c$ | Average substitution degree (%) | Tg |
|---|---|---|---|---|---|---|---|---|---|
| Example 1 | (bisphenol-type structure with CH₃ groups) | 2.0 g THF | 1.1 ml | $CH_2=CHCH_2Br$ | 0.20 g | reflux temp., 1 hr | 0.40 | 0.7% | 210° C. |
| Example 2 | | | 2.2 ml | | 0.40 g | | 0.40 | 4% | 212° C. |
| Example 3 | | | 3.2 ml | | 0.61 g | | 0.40 | 10% | 193° C. |
| Example 4 | | | 5.4 ml | | 1.0 g | 23° C., 1 hr | 0.40 | 18% | 184° C. |
| Example 5 | | | 10.8 ml | | 2.0 g | | 0.39 | 24% | 169° C. |
| Example 6 | | | 21.5 ml | | 4.0 g | | 0.39 | 52% | 150° C. |
| Example 7 | | | 43.0 ml | | 8.1 g | | 0.38 | 80% | 142° C. |
| Example 8 | H— | 2.0 g THF | 10.2 ml | $CH_2=CHCH_2Br$ | 2.5 g | 50° C., 3 hr | 0.91 | 28% | 165° C. |
| Example 9 | $CH_3-C(CH_3)_2-[-\phi(CH_3)-O-]_3$ | 2.0 g THF | 3.2 ml | $CH_2=CHCH_2Br$ | 0.61 g | 23° C., 1 hr | 0.80 | 9% | 194° C. |

TABLE 2

| Curable PPE | | Alkenyl group | Average substitution degree (%) | Curing temperature (°C.) | Chloroform extraction ratio (%) | Tg (°C.) | $\alpha_1$*1 (1/°C.) | $\alpha_2$*2 (1/°C.) | Ratio of 3,5-dimethyl-phenol formed (%) | $\varepsilon r$ | $\tan\delta$ |
|---|---|---|---|---|---|---|---|---|---|---|---|
| | Q = structure with CH₃ groups and central C(CH₃)₂ | | | | | | | | | | |
| Example 1 | | CH₂=CHCH₂— | 0.7 | 280 | 8.4 | 266 | $6.4 \times 10^{-5}$ | $4.0 \times 10^{-4}$ | 8.4 | 2.60 | $1.0 \times 10^{-3}$ |
| Example 2 | | | 4 | | 2.3 | 265 | $6.2 \times 10^{-5}$ | $3.2 \times 10^{-4}$ | 10.1 | 2.60 | $1.0 \times 10^{-3}$ |
| Example 3 | | | 10 | | 2.3 | 264 | $6.5 \times 10^{-5}$ | $2.2 \times 10^{-4}$ | 10.7 | 2.65 | $1.0 \times 10^{-3}$ |
| Example 4 | | | 18 | | 2.2 | —*3 | $6.6 \times 10^{-5}$ | —*3 | 15.1 | 2.71 | $1.0 \times 10^{-3}$ |
| Example 5 | | | 24 | | 0.7 | —*3 | $6.2 \times 10^{-5}$ | —*3 | 17.9 | 2.73 | $1.0 \times 10^{-3}$ |
| Example 6 | | | 52 | | 1.5 | —*3 | $6.5 \times 10^{-5}$ | —*3 | 22.1 | 2.74 | $1.0 \times 10^{-3}$ |
| Example 7 | | | 80 | | 0.3 | —*3 | $6.1 \times 10^{-5}$ | —*3 | 27.3 | 2.77 | $1.0 \times 10^{-3}$ |

| Curable PPE | | Alkenyl group | Average substitution degree (%) | Curing temperature (°C.) | Chloroform extraction ratio (%) | Tg (°C.) | $\alpha_1$*1 (1/°C.) | $\alpha_2$*2 (1/°C.) | Ratio of 3,5-dimethyl-phenol formed (%) | $\varepsilon r$ | $\tan\delta$ |
|---|---|---|---|---|---|---|---|---|---|---|---|
| | Q = structure with CH₃ groups and central C(CH₃)₂ | | | | | | | | | | |
| Comparative Example 1 | | CH₂=CHCH₂— | 0.05 | 280 | 21 | 267 | $6.3 \times 10^{-5}$ | $5.2 \times 10^{-4}$ | —*4 | 2.60 | $1.0 \times 10^{-3}$ |
| Comparative Example 2 | | | 0 | | 100 | 195 | $7.4 \times 10^{-5}$ | $3.9 \times 10^{-3}$ | —*4 | | |
| Comparative Example 3 | | | 0 | 280 | 58 | 267 | $6.0 \times 10^{-5}$ | $5.3 \times 10^{-4}$ | —*4 | 2.59 | $7.0 \times 10^{-4}$ |
| Example 8 | | H— | 28 | | 0.5 | —*3 | $6.3 \times 10^{-5}$ | —*3 | 19.8 | 2.70 | $1.0 \times 10^{-3}$ |
| Comparative Example 4 | | | 0 | 280 | 31 | 266 | $6.2 \times 10^{-5}$ | $5.3 \times 10^{-4}$ | —*4 | 2.59 | $7.0 \times 10^{4}$ |

TABLE 2-continued

| Example | | | | | | | |
|---|---|---|---|---|---|---|---|
| Example 9 | ![structure: CH₃-C(-C₆H₂(CH₃)₂-O-)₃ with CH₂=CHCH₂-] | 9 | 280 | 1.2 | 260 | $6.8 \times 10^{-5}$ $2.1 \times 10^{-4}$ 11.5 | 2.64 $1.0 \times 10^{-3}$ |

*Note:
[1] Coefficient of linear expansion between 23° C. and glass transition temperature (Tg).
[2] Coefficient of linear expansion at temperatures higher than Tg.
[3] Glass transition temperature was not clearly observed at up to 300° C.
[4] Almost no pyrolytically decomposed products

EXAMPLES 10 TO 16

Synthesis of curable polyphenylene ether resin

Incorporation of an allyl group into PPE-1 was performed in substantially the same manner as in Example 1, thereby obtaining a polymer having an average allyl group substitution degree of 10 %. 1.8 g of this polymer was dissolved in 60 ml of chloroform, and 2.2 ml of a 1.0 mol/liter dichloromethane solution of bromine was added. The mixture was agitated at 23° C. for 30 min, and a large volume of methanol was poured to the mixture, thereby depositing a polymer. The polymer was filtered off, and washed with methanol. This was repeated three times in total. Then, the polymer was dried in vacuo at 60° C. for 12 hr. Thus, a white powdery product was obtained.

The whole amount of the product was dissolved in 100 ml of tetrahydrofuran, and cooled to −70° C. A tetrahydrofuran solution of lithium diisopropylamide prepared from 0.52 g of diisopropylamine and 3.3 ml of 1.6 mol/l n-butyllithium was added to the solution, and agitated in a nitrogen atmosphere for 5 min. A small amount of methanol was added, thereby terminating the reaction. The temperature of the mixture was increased to about 25° C., and the mixture was poured into a large volume of methanol. With respect to the thus deposited polymer, the average propargyl group substitution degree was measured by means of $^1$H-NMR. The average propargyl group substitution degree was in agreement with the average allyl group substitution degree (Example 10).

The above procedure was repeated except that the average allyl group substitution degree was varied as shown in Table 3 (Examples 11 to 14). Moreover, with respect to each of the polymers obtained by incorporating an allyl group into PPE-2 and PPE-3, a similar reaction was performed (Examples 15 and 16).

Figure 4:
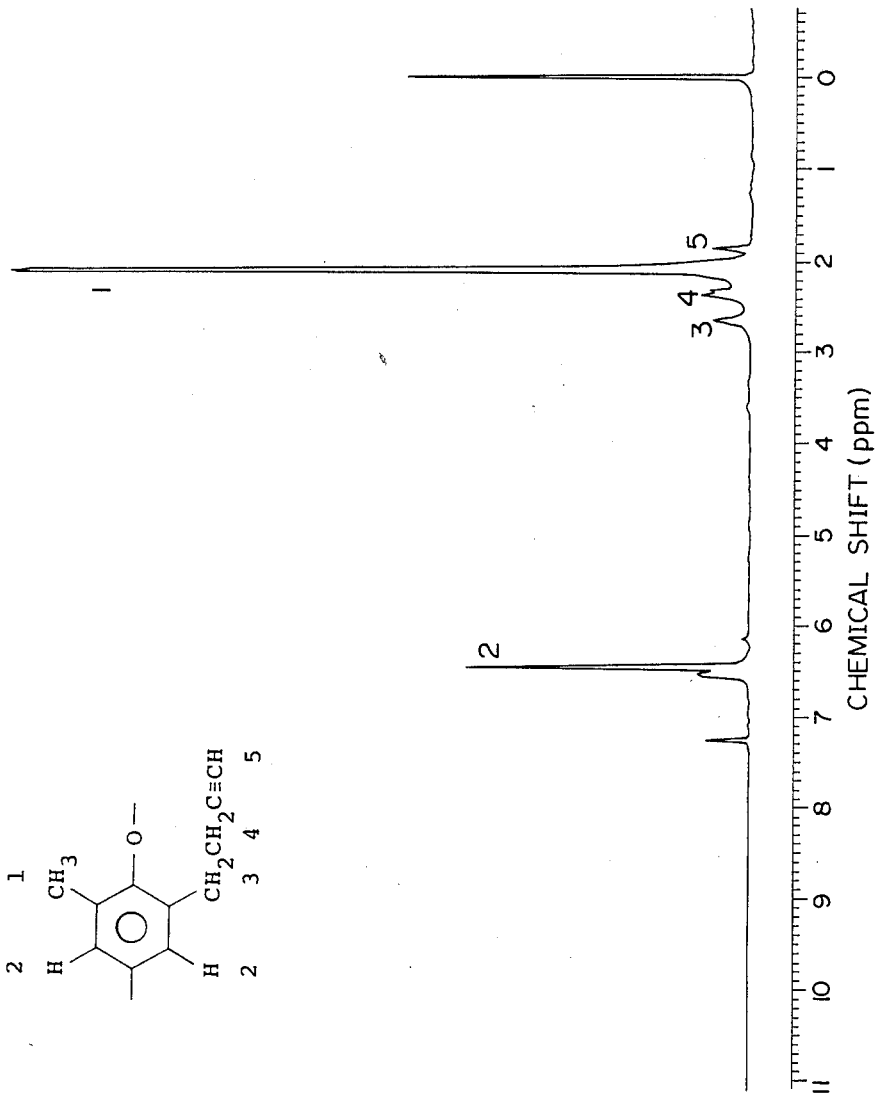
FIG. 4 is the $^1$H-NMR spectrum of a curable polyphenylene ether of the present invention obtained in Example 12.
Figure 5:
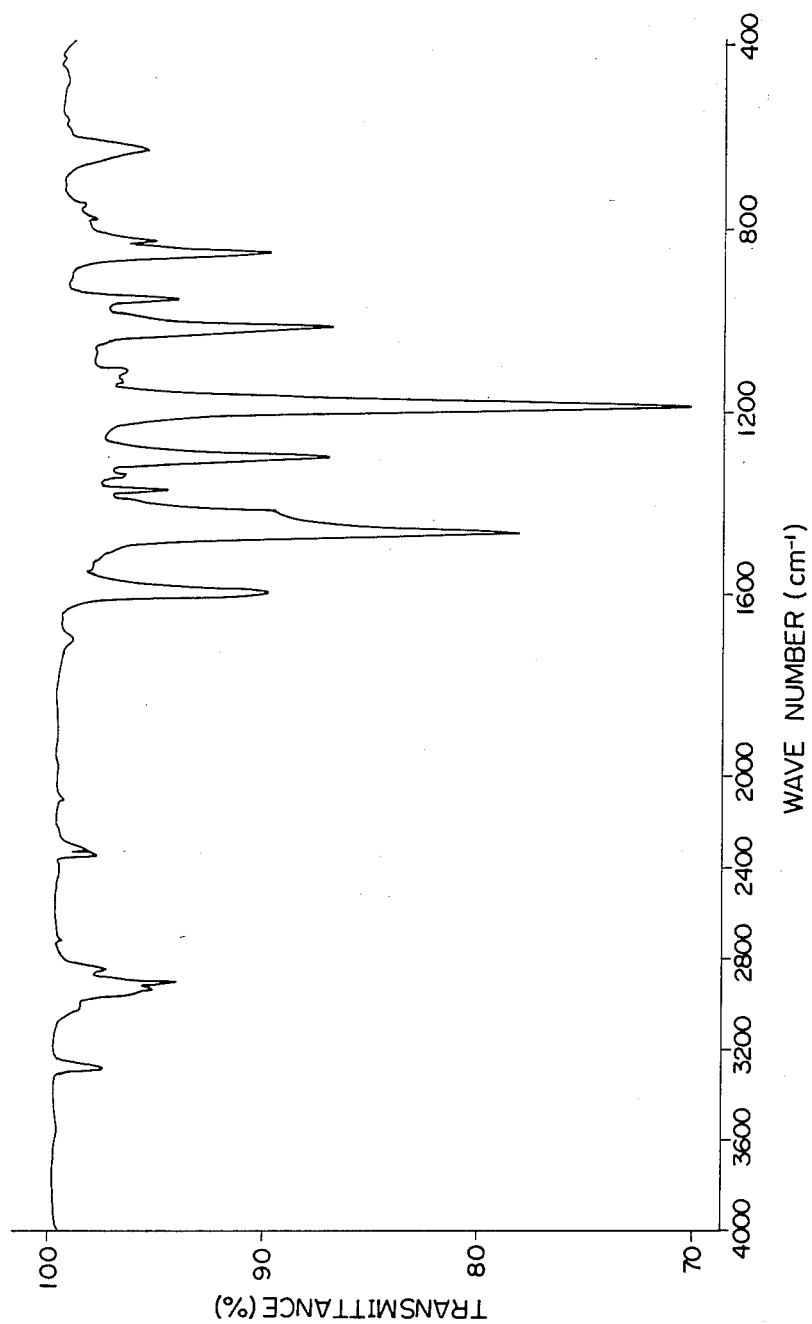
FIG. 5 is the IR spectrum of a curable polyphenylene ether of the present invention obtained in Example 12.

The reaction conditions and the properties of the obtained polymers are shown in Table 3. The viscosity number ($\eta$sp/c), average substitution degree and Tg were determined in substantially the same manners as in Examples 1 to 9. With respect to all of the polymers, the average propargyl group substitution degree was in agreement with the average substitution degree of precursor allyl groups. $^1$H-NMR spectrum (CDCl$_3$ solution) of the polymer of Example 12 is shown in FIG. 4, and IR spectrum (diffuse reflectance method) of the polymer is shown in FIG. 5. The spectrum of FIG. 5 shows the following characteristic peaks:

(1) $\nu$s≡C—H (3307 cm$^{-1}$), (1) $\nu$s ≡C—H (3307 cm$^{-1}$),
(2) $\nu$s, $\nu$as CH$_3$, CH$_2$ (3027—2862 cm$^{-1}$),
(3) $\nu$s C≡C (1603 cm$^{-1}$),
(4) $\delta$as CH$_3$ (1470 cm$^{-1}$),
 $\nu$s C≡C
(5) $\delta$s CH$_3$ (1381 cm$^{-1}$), and
(6) $\nu$as O—C (1190 cm$^{-1}$).

Thermal curing of curable polyphenylene ether resin

With respect to each of the obtained polymers, a cast film having a thickness of about 100 μm was prepared in substantially the same manner as in Examples 1 to 9. This film was sandwiched between glass plates, and heated in an air oven of 260° C. for 30 min. In Examples 10 to 12, 15 and 16, a 2 mm-thick sheet was prepared by subjecting the above-mentioned films to vacuum press molding at 220° C. for 1 hr and at 260° C. for 30 min. In Examples 13 and 14, a 2 mm thick film was prepared directly from powdery polymer product by vacuum press molding operated under conditions as mentioned above.

The physical properties of the polymers measured with respect to such films and sheets are shown in Table 4. The measurement of the properties was conducted in substantially the same manner as in Examples 1 to 9.

With respect to all of the Examples, a polyphenylene ether matrix was confirmed by pulverizing a cured product and subjecting the powder to FT-IR (diffuse reflectance method). The presence of a polyphenylene ether chain having the same structure as that before curing, in a CDCl$_3$ extract was confirmed by means of $^1$H-NMR.

COMPARATIVE EXAMPLE 6

The curable polyphenylene ether resin as employed in Example 14 was cured by heating at 340° C. for 1 hr. The thus cured polyphenylene ether resin exhibited a chloroform extraction amount of 0%. The resin was very brittle, and hence was not suited for actual use.

TABLE 3

| | Alkenyl-substituted PPE | | Br$_2$/ | | | | Physical properties of alkynyl-substituted PPE | |
|---|---|---|---|---|---|---|---|---|
| | Q | Alkenyl group | CH$_2$Cl$_2$ [1.0 M] | R$_2$NH | n-BuLi [1.6 M] | $\eta$sp/c | Average substitution degree | Tg |
| Example 10 | (structure with CH$_3$ groups, bisphenol-type Q: —O—C$_6$H$_2$(CH$_3$)$_2$—C(CH$_3$)$_2$—C$_6$H$_2$(CH$_3$)$_2$—O—) | CH$_2$=CHCH$_2$— | 1.8 g 2.2 ml | R = isopropyl | 0.52 g 3.3 ml | 0.40 | 10% | 208° C. |
| Example 11 | | | 4.0 ml | | 0.95 g 6.1 ml | 0.40 | 19% | 191° C. |
| Example 12 | | | 5.4 ml | | 1.27 g 8.2 ml | 0.39 | 26% | 179° C. |
| Example 13 | | | 9.8 ml | | 2.32 g 14.9 ml | 0.39 | 51% | 160° C. |
| Example 14 | | | 14.1 ml | | 3.32 g 21.3 ml | 0.38 | 79% | 149° C. |
| Example 15 | | CH$_2$=CHCH$_2$— | 1.8 g 5.8 ml | R = cyclohexyl | 1.68 g 9.0 ml | 0.91 | 28% | 170° C. |

TABLE 3-continued

| | Alkenyl-substituted PPE | | Br$_2$/CH$_2$Cl$_2$ [1.0 M] | | R$_2$NH | n-BuLi [1.6 M] | Physical properties of alkynyl-substituted PPE | | |
|---|---|---|---|---|---|---|---|---|---|
| | Q | Alkenyl group | | | | | $\eta$sp/c | Average substitution degree | Tg |
| Example 16 | CH$_3$—C—(⟨CH$_3$, CH$_3$⟩—O)$_3$— | CH$_2$=CHCH$_2$— | 2.0 g | 2.2 ml | R = isopropyl 0.52 g | 3.3 ml | 0.80 | 9% | 196° C. |

TABLE 4

| | Curable polyphenylene ether resin | | Average substitution degree (%) | Curing temperature (°C.) |
|---|---|---|---|---|
| | Q | Alkynyl group | | |
| Example 10 | —O—⟨CH$_3$,CH$_3$⟩—C(CH$_3$)$_2$—⟨CH$_3$,CH$_3$⟩—O— | CH≡CCH$_2$— | 10 | 260 |
| Example 11 | | | 19 | |
| Example 12 | | | 26 | |
| Example 13 | | | 51 | |
| Example 14 | | | 79 | |
| Example 15 | H— | CH≡CCH$_2$— | 28 | 260 |
| Example 16 | CH$_3$—C—(⟨CH$_3$, CH$_3$⟩—O)$_3$— | CH≡CCH$_2$— | 9 | 260 |

| | Chloroform extraction ratio (%) | Tg (°C.) | $\alpha_1$*[1] (1/°C.) | $\alpha_2$*[2] (1/°C.) | Ratio of 3,5-dimethyl-phenol formed (%) | $\epsilon_r$ | Tan$\delta$ |
|---|---|---|---|---|---|---|---|
| Example 10 | 2.2 | 210 | 8.2 × 10$^{-5}$ | 2.0 × 10$^{-4}$ | 17.5 | 2.61 | 1.0 × 10$^{-3}$ |
| Example 11 | 1.3 | —*[3] | 8.1 × 10$^{-5}$ | —*[3] | 20.1 | 2.67 | 1.0 × 10$^{-3}$ |
| Example 12 | 0.6 | —*[3] | 8.5 × 10$^{-5}$ | —*[3] | 21.2 | 2.70 | 1.0 × 10$^{-3}$ |
| Example 13 | 0.6 | —*[3] | 8.4 × 10$^{-5}$ | —*[3] | 25.6 | 2.72 | 1.0 × 10$^{-3}$ |
| Example 14 | 0.2 | —*[3] | 8.2 × 10$^{-5}$ | —*[3] | 29.4 | 2.75 | 1.0 × 10$^{-3}$ |
| Example 15 | 0.4 | —*[3] | 8.5 × 10$^{-5}$ | —*[3] | 21.9 | 2.71 | 1.0 × 10$^{-3}$ |
| Example 16 | 1.4 | 219 | 8.0 × 10$^{-5}$ | 2.2 × 10$^{-4}$ | 18.6 | 2.61 | 1.0 × 10$^{-3}$ |

Note:
[1] Linear expansion coefficient from 23° C. to the glass transition temperature (Tg)
[2] Linear expansion coefficient at higher than Tg
[3] No clear Tg was observed up to 300° C.

EXAMPLES 17 TO 22

Synthesis of curable polyphenylene ether resins

Substantially the same reaction as in Examples 1 to 9 was conducted except that various alkenyl halides as shown in Table 5 were employed instead of allyl bromide. PPE-1 was used in Examples 17 and 18. Poly 2,6-dimethyl-1,4-phenylene ether [viscosity ($\eta$sp/c): 0.59 (hereinafter referred to as PPE-4)] was used in Examples 19 to 21. A bifunctional polyphenylene ether obtained by oxidative polymerization of 2,6-dimethylphenol (hereinafter referred to as PPE-5) in the presence of bis (3,5-dimethyl-4-hydroxyphenyl) sulfone as a polyfunctional phenol compound was used in Example 22. Toluene/TMEDA (100 ml +2.5 ml) was used as a solvent instead of THF in Examples 19 and 22.

The reaction conditions and results are shown in Table 5.

When each of the resins obtained in Examples 19 to 21 was dissolved in trichloroethylene and the resultant solution was stored for 3 months, no formation of gel occurred.

Thermal curing of curable polyphenylene ether resins

The resins obtained were thermally cured in substantially the same manner as in Examples 1 to 9 and the physical properties of the resultant cured resins were measured. The results are shown in Table 6.

With respect to a fine powder of each of the cured polyphenylene ether resins, FT-IR measurement was conducted in substantially the same manner as in Examples 1 to 9, thereby confirming that all of the cured resins comprised a polyphenylene ether skeleton. The fine powder of the cured polyphenylene ether resins was subjected to extraction with deuterated chloroform ($CDCl_3$), and then the resultant $CDCl_3$ extract was subjected to $^1$H-NMR measurement in substantially the same manner as in Examples 1 to 9. As a result, the presence of a polyphenylene ether chain having the same structure as that of the curable polyphenylene ether resins was confirmed.

In example 19, the viscosity number ($\eta sp/c$) of the chloroform extracted polyphenylene ether was 0.20. In Example 22, the viscosity number ($\eta sp/c$) of the chloroform extracted polyphenylene ether was 0.07.

COMPARATIVE EXAMPLE 7

The substitution reaction, thermal curing and measurement of physical properties were performed in substantially the same manner as in Example 17, except that the substitution degree was changed to 0.05 %. The results are shown in Table 6. As apparent from Table 6, chemical resistance improvement was not sufficient.

TABLE 5

| | PPE Q | | Solvent | n-BuLi [1.6 M] | Alkenyl halide | | Reaction conditions | $\eta sp/c$ | Average substitution degree | Tg |
|---|---|---|---|---|---|---|---|---|---|---|
| Example 17 | [structure: tetramethyl bisphenol with C(CH3)2 bridge] | | 2.0 g | THF | 4.1 ml | $CH_2=CHCH_2CH_2Br$ | 0.90 g | reflux temp., 1 hr | 0.40 | 11% | 190° C. |
| Example 18 | | | | | 10.2 ml | | 2.3 g | 23° C., 1 hr | 0.39 | 27% | 162° C. |
| Example 19 | H— | | 2.0 g | Toluene/ TMEDA | 5.1 ml | $CH_3CH=CHCH_2Cl$ | 0.76 g | 23° C., 6 hr | 0.59 | 11% | 192° C. |
| Example 20 | · | | | THF | 4.1 ml | $(CH_3)_2C=CHCH_2Br$ | 1.0 g | reflux temp., 1 hr | 0.59 | 13% | 190° C. |
| Example 21 | | | | THF | 10.2 ml | $CH_2=C(CH_3)CH_2Cl$ | 1.5 g | 23° C. 1 hr | 0.59 | 21% | 170° C. |
| Example 22 | [structure: tetramethyl bisphenol with SO2 bridge] | | 2.0 g | Toluene/ TMEDA | 10.4 ml | $CH_2=CH(CH_2)_3Br$ | 1.0 g | 23° C., 1 hr | 0.21 | 10% | 185° C. |

TABLE 6

| | Curable polyphenylene ether resin Q | Alkenyl group | Average substitution degree (%) | Curing temperature (°C.) | Chloroform extraction ratio (%) | Tg (°C.) | $\alpha_1$*(1) (1/°C.) | $\alpha_2$*(2) (1/°C.) | Ratio of 3,5-dimethyl-phenol formed (%) | εr | Tanδ |
|---|---|---|---|---|---|---|---|---|---|---|---|
| Example 17 | ![structure with C(CH3)2 bridge] | CH$_2$=CHCH$_2$CH$_2$— | 11 | 280 | 2.4 | 264 | $6.5 \times 10^{-5}$ | $2.4 \times 10^{-4}$ | 10.4 | 2.60 | $1.0 \times 10^{-3}$ |
| Example 18 | | CH$_2$=CHCH$_2$CH$_2$— | 27 | | 0.7 | —*(3) | $6.0 \times 10^{-5}$ | —*(3) | 18.1 | 2.71 | $1.0 \times 10^{-1}$ |
| Comparative Example 7 | | CH$_2$=CHCH$_2$CH$_2$— | 0.05 | | 23 | 265 | $6.1 \times 10^{-5}$ | $5.5 \times 10^{-4}$ | —*(4) | 2.59 | $1.0 \times 10^{-3}$ |
| Example 19 | | CH$_3$CH=CHCH$_2$— | 11 | 280 | 2.5 | 266 | $6.0 \times 10^{-5}$ | $2.3 \times 10^{-4}$ | 10.1 | 2.60 | $1.0 \times 10^{-3}$ |
| Example 20 | H— | (CH$_3$)$_2$C=CHCH$_2$— | 13 | 280 | 2.8 | 262 | $6.3 \times 10^{-5}$ | $2.8 \times 10^{-4}$ | 11.3 | 2.60 | $1.0 \times 10^{-3}$ |
| Example 21 | H— | CH$_2$=C(CH$_3$)CH$_2$— | 21 | | 1.0 | —*(3) | $6.2 \times 10^{-5}$ | —*(3) | 16.1 | 2.64 | $1.0 \times 10^{-3}$ |
| Example 22 | ![structure with SO2 bridge] | CH$_2$=CH(CH$_2$)$_3$— | 10 | 280 | 2.6 | 264 | $6.2 \times 10^{-5}$ | $2.6 \times 10^{-4}$ | 11.8 | 2.61 | $1.0 \times 10^{-3}$ |

Note:
*(1)Linear expansion coefficient from 23° C. to the glass transition temperature (Tg)
*(2)Linear expansion coefficient at higher than Tg
*(3)No clear Tg was observed up to 300° C.
*(4)Almost no products

EXAMPLES 23 TO 25

Syntheses of curable polyphenylene ether resins

In Examples 23 and 24, 3-butenyl groups were introduced into PPE-1 in substantially the same manner as in Examples 17 and 18. Further, the 3-butenyl groups were converted to 3-butynyl groups in substantially the same manner as in Examples 10 to 16. During the above-mentioned reaction, the average substitution degree was not changed.

In Example 25, 5-hexenyl groups were introduced into PPE-5. Further, 5-hexenyl groups were converted to 5-hexynyl groups in substantially the same manner as in Examples 10 to 16 except that a commercially available sodium amide was used instead of lithium diisopropylamide, and that the reaction was conducted at −70° C. for 30 min. The average substitution degree was not changed. The reaction conditions and the results are shown in Table 7.

Thermal curing of curable polyphenylene ether resins

Each of the above-obtained curable polyphenylene ether resins was subjected to thermal curing in substantially the same manner as in Examples 10 to 16, at 260° C. for 30 min, thereby obtaining a sheet of the cured polyphenylene ether resin having a thickness of 2 mm. The thus obtained sheet was subjected to measurements of physical properties. The results are shown in Table 8.

Further, each of the sheets was reduced to powder and subjected to infrared spectroscopic analysis by Fourier-transform infrared spectroscopy (diffuse reflectance method). As a result, the presence of a skeleton of polyphenylene ether resin was confirmed with respect to all of the sheets.

Moreover, each of the above-obtained powders was subjected to extraction with deuterated chloroform, and the extract was subjected to $^1$H-NMR analysis. As a result, it was confirmed that a polyphenylene ether chain having the same structure as that of the uncured polyphenylene ether was present in the extract.

TABLE 7

| | Alkenyl PPE | | Br₂/CH₂Cl₂ [1.0 M] | | | n-BuLi [1.6 M] | | Properties of alkynyl-substituted PPE | |
|---|---|---|---|---|---|---|---|---|---|
| | Q | alkenyl group | (g) | (ml) | R₂NH | | ηsp/c | Average substitution degree(%) | Tg(°C.) |
| Example 23 | CH₃–O–⟨C₆H₂(CH₃)₂⟩–C(CH₃)₂–⟨C₆H₂(CH₃)₂⟩–O–CH₃ | CH₂=CHCH₂CH₂— | 1.8 | 2.4 | 0.56 g (R=isopropyl) | 3.4 ml | 0.40 | 11 | 192 |
| Example 24 | | | | 5.4 | 1.29 g (R=isopropyl) | 7.9 ml | 0.39 | 27 | 163 |
| Example 25 | CH₃–O–⟨C₆H₂(CH₃)₂⟩–SO₂–⟨C₆H₂(CH₃)₂⟩–O–CH₃ | CH₂=CH(CH₂)₄— | 2.0 | 3.6 | NaNH₂ 0.40 g | | 0.21 | 16 | 180 |

TABLE 8

| | Curable PPE | | Average substitution degree (%) | Curing temperature (°C.) | Chloroform extraction ratio (%) | Tg (°C.) | $\alpha_1^{*(1)}$ (1/°C.) | $\alpha_2^{*(2)}$ (1/°C.) | Ratio of 3,5-dimethyl-phenol formed (%) | $\epsilon r$ | $\tan\delta$ |
|---|---|---|---|---|---|---|---|---|---|---|---|
| | Q | alkynyl group | | | | | | | | | |
| Example 23 | CH₃—〇—CH₃ / CH₃—C(CH₃)(CH₃)—〇—CH₃ with —O— | CH≡CCH₂CH₂— | 11 | 260 | 2.3 | 228 | $8.5 \times 10^{-5}$ | $4.2 \times 10^{-4}$ | 14.4 | 2.60 | $1.0 \times 10^{-3}$ |
| Example 24 | (same) | | 27 | | 0.8 | —*(3) | $8.4 \times 10^{-5}$ | —*(3) | 21.6 | 2.69 | $1.0 \times 10^{-3}$ |
| Example 25 | CH₃—〇—SO₂—〇—CH₃ (with O—, CH₃ substituents) | CH≡C(CH₂)₄— | 16 | 260 | 1.3 | 220 | $8.3 \times 10^{-5}$ | $2.0 \times 10^{-4}$ | 19.8 | 2.63 | $1.0 \times 10^{-3}$ |

*Note:
*(1)Coefficient of linear expansion between 23° C. and glass transition temperature (Tg).
*(2)Coefficient of linear expansion at temperatures higher than Tg.
*(3)Glass transition temperature was not clearly observed at up to 300° C.

EXAMPLES 26 TO 30

Syntheses of curable polyphenylene ether resins

Substantially the same procedure as in Examples 1 to 9 was repeated except that various alkynyl halides were used instead of allyl bromide. The reaction conditions and the results are shown in Table 9. In Examples 26 to 28, PPE-4 was used as a raw material. In Example 29, a polyphenylene ether resin having a bifunctional phenol residue, which was synthesized from 3,3',5,5'-tetramethylbiphenyl4,4'-diol and 2,6-dimethylphenol was used. In Example 30, PPE-1 was used as a raw material. Further, in Example 29, the reaction was conducted in a slurry using as a solvent a mixture of 100 ml of cyclohexane and 2.5 ml of TMEDA.

Thermal curing of curable polyphenylene ether resins

In substantially the same manner in Examples 10 to 16, each of the above-obtained curable polyphenylene ether resins was subjected to thermal curing at 260° C. for 30 min, to thereby obtaining a sheet of the cured polyphenylene ether resin having a thickness of 2 mm. The thus obtained sheet was subjected to measurements of physical properties. The results are shown in Table 10.

Further, each of the sheets was reduced to powder and subjected to infrared spectroscopic analysis by Fourier-transform infrared spectroscopy (diffuse reflectance method). As a result, the presence of a skeleton of polyphenylene ether resin was confirmed with respect to all of the sheets.

Moreover, each of the above-obtained powders was subjected to extraction with deuterated chloroform, and the extract was subjected to $^1$H-NMR analysis. As a result, it was confirmed that a polyphenylene ether chain having the same structure as that of the uncured polyphenylene ether was present in the extract.

In Example 30, the viscosity number ($\eta$sp/c) of the chloroform extracted polyphenylene ether was 0.22.

COMPARATIVE EXAMPLE 8

According to the method as described in Example 30, propargyl groups were introduced into PPE-1 so that the propargyl group content became 0.05 %. The resultant PPE-1 was subjected to thermal curing at 260° C. for 30 min. After completion of the curing, the thus cured polyphenylene ether resin was subjected to measurements of physical properties. As a result, it was found that the chemical resistance was not sufficiently improved. The results are also shown in Table 10.

TABLE 9

| | PPE | | n-BuLi [1.6 M] (ml) | Alkynyl halide | | Reaction conditions | Properties of alkynyl-substituted PPE | | Average substitution degree (%) | Tg (°C.) |
|---|---|---|---|---|---|---|---|---|---|---|
| | Q | (g) Solvent | | Kind | Amount (g) | | ηsp/c | | | |
| Example 26 | H— | 2.0 THF | 10.4 | CH≡CCH$_2$CH$_2$Br | 2.2 | 23° C., 2 hr | 0.59 | | 5 | 205 |
| Example 27 | | | 5.2 | CH$_3$C≡CCH$_2$Br | 1.1 | reflux temperature 1 hr. | 0.59 | | 18 | 187 |
| Example 28 | | | 4.2 | CH$_3$CH$_2$C≡CCH$_2$I | 1.3 | 23° C., 2 hr | 0.59 | | 11 | 189 |
| Example 29 | 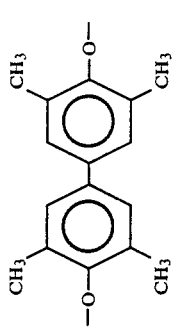 | 2.0 cyclohexane/ TMEDA | 10.4 | CH$_3$C≡CCH$_2$CH$_2$Br | 2.5 | 60° C., 2 hr | 0.33 | | 10 | 184 |
| Example 30 | 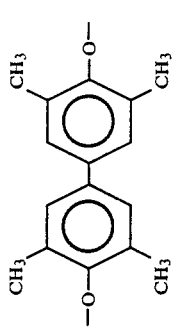 | 2.0 toluene/ TMEDA | 10.8 | CH≡CCH$_2$Br | 2.0 | 23° C., 2 hr | 0.40 | | 5 | 206 |

TABLE 10

| | Curable PPE | | | | Chloroform extraction ratio (%) | Tg (°C) | $\alpha_1$*(1) (1/°C.) | $\alpha_2$*(2) (1/°C.) | Ratio of 3,5-dimethylphenol formed (%) | $\epsilon r$ | $\tan\delta$ |
|---|---|---|---|---|---|---|---|---|---|---|---|
| | Q | alkynyl group | Average substitution degree (%) | Curing temperature (°C) | | | | | | | |
| Example 26 | H— | CH≡CCH$_2$CH$_2$— | 5 | 260 | 3.1 | 220 | $8.4 \times 10^{-5}$ | $5.0 \times 10^{-4}$ | 13.0 | 2.60 | $1.0 \times 10^{-3}$ |
| Example 27 | | CH$_3$C≡CCH$_2$— | 18 | | 1.5 | —*(3) | $8.2 \times 10^{-5}$ | —*(3) | 19.2 | 2.62 | $1.0 \times 10^{-3}$ |
| Example 28 | | CH$_3$CH$_2$C≡CCH$_2$— | 11 | | 2.5 | 224 | $8.6 \times 10^{-5}$ | $3.9 \times 10^{-4}$ | 16.0 | 2.60 | $1.0 \times 10^{-3}$ |
| Example 29 | 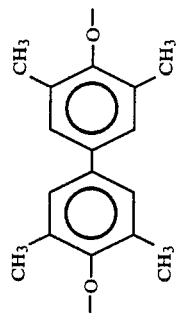 | CH$_3$C≡CCH$_2$CH$_2$— | 10 | 260 | 2.1 | 216 | $8.7 \times 10^{-5}$ | $4.5 \times 10^{-5}$ | 15.4 | 2.61 | $1.0 \times 10^{-3}$ |
| Example 30 |  | CH≡CCH$_2$— | 5 | 260 | 2.9 | 225 | $8.6 \times 10^{-5}$ | $4.9 \times 10^{-4}$ | 12.5 | 2.60 | $1.0 \times 10^{-3}$ |
| Comparative Example 8 | | | 0.05 | | 24 | 210 | $8.0 \times 10^{-5}$ | $4.8 \times 10^{-3}$ | —*(4) | 2.60 | $1.0 \times 10^{-3}$ |

*Note:
*(1)Coefficient of linear expansion between 23° C. and glass transition temperature (Tg).
*(2)Coefficient of linear expansion at temperatures higher than Tg.
*(3)Glass transition temperature was not clearly observed at up to 300° C.
*(4)Almost no pyrolytic product was obtained.

EXAMPLES 31 TO 35

100 parts by weight of a poly-2,6-dimethyl-1,4-phenylene ether into which allyl groups were introduced as substituents at an average substitution degree of 10 % and which had a viscosity number (ηsp/c) of 0.62 as measured in a 0.5 g/dl chloroform solution at 30.0° C. and 3 parts by weight of each of various radical polymerization initiators as shown in Table 11 were dissolved in 3000 parts by weight of chloroform. From each of the resultant solutions, films each having a thickness of about 100 μm were prepared in substantially the same manner as in Examples 1 to 9 except that the films were dried in vacuo at 80° C. for 4 hours. The films were sandwiched between a pair of glass plates and heated at a temperature as shown in Table 11 for 30 min in an air oven.

Separately, with respect to each of the resins, 10 films as mentioned above were piled up and subjected to press molding by means of a vacuum pressing machine at a temperature as shown in Table 11 for 30 min, thereby obtaining a cured sheet having a thickness of 1 mm.

The above-obtained films and sheets were subjected to measurements of the chloroform extract amount and the amount of 3,5-dimethylphenol formed in substantially the same manner as in Examples 1 to 9. The results are shown in Table 11.

As apparent from the results shown in Table 11, the use of a free-radical initiator enabled the chloroform extract amount to be decreased.

Further, the films and sheets were each reduced to powder and subjected to infrared spectroscopic analysis by Fourier-transform spectroscopy (diffuse reflectance method). As a result, the presence of a skeleton of polyphenylene ether was confirmed with respect to all of the above-obtained powders.

Moreover, the films and sheets were each subjected to extraction with deuterated chloroform, and the extract was subjected to $^1$H-NMR analysis. As a result, it was confirmed that a polyphenylene ether chain having the same structure as that of the uncured polyphenylene ether was present in the extract.

In Example 31, the viscosity number (ηsp/c) of the chloroform extracted polyphenylene ether was 0.19. Further, the viscosity numbers (ηsp/c) of the chloroform extracted polyphenylene ethers in Examples 32, 33 and 34 were 0.10, 0.09 and 0.09, respectively.

TABLE 11

|  | Radical polymerization initiator | Curing temperature (°C.) | Chloroform extraction ratio (%) | Ratio of 3,5-dimethyl phenol (%) |
|---|---|---|---|---|
| Example 31 | none | 280 | 3.0 | 10.8 |
| Example 32 | 2,5-dimethyl-2,5-di(t-butylperoxy)hexyne-3 | 280 | 1.7 | 14.0 |
| Example 33 | dicumyl peroxide | 260 | 1.6 | 13.8 |
| Example 34 | di-t-butylperoxide | 260 | 1.6 | 13.3 |
| Example 35 | 2,3-dimethyl-2,3-diphenylbutane | 300 | 1.3 | 14.2 |

EXAMPLES 36 TO 39

1.4 g of a poly-2,6-dimethyl-1,4-phenylene ether into which allyl groups were introduced as substituents at an average substitution degree of 10% and which had a viscosity number (0sp/c) of 0.62 as measured in a 0.5 g/dl chloroform solution at 30.0° C. and 42 mg of 2,5-dimethyl-2,5-di(t-butylperoxy) hexyne-3 were dissolved in 40 ml of chloroform. The resultant solution was put in a glassmade petri dish with a flat bottom having a diameter of 220 mm and allowed to stand at about 23° C. for 12 hours. The thus formed film was peeled off from the petri dish and dried at 80 ° C for 4 hours, thereby obtaining a film having a thickness of about 100 μm. The film was sandwiched between a pair of glass plates and heated at 280° C. for 30 min in an air oven. From the thus obtained cured film, a strip having a width of 1 cm was cut off. The strip was subjected to measurements of tensile strength at break and tensile elongation at break (Example 36).

On the other hand, with respect to the film which was not subjected to heat treatment, also, the tensile strength at break and tensile elongation at break were measured (Example 37).

Further, substantially the same procedure as mentioned above was repeated except that a poly-2,6-dimethyl-1,4-phenylene ether into which allyl groups were introduced as substituents at an average substitution degree of 18 % and which had a viscosity number (ηsp/c) of 0.47 as measured in a 0.5 g/dl chloroform solution at 30.0° C. was used to thereby obtain a film. The resultant strip film was subjected to measurements of tensile strength at break and tensile elongation at break (Example 38).

Moreover, with respect to the just above-mentioned film before heat treatment, also, the tensile strength at break and tensile elongation at break were measured (Example 39).

The results are shown in Table 12. All of the resins exhibited excellent tensile strength at break.

TABLE 12

|  | Allyl group content in curable PPE (%) | Curing | Tensile strength at break (kg/cm$^2$) | Tensile elongation at break (%) |
|---|---|---|---|---|
| Example 36 | 10 | Yes | 780 | 11 |
| Example 37 | 10 | No | 700 | 10 |
| Example 38 | 18 | Yes | 720 | 10 |
| Example 39 | 18 | No | 660 | 10 |

What is claimed is:

1. A cured polyphenylene ether resin comprising a chloroform nonextractable polyphenylene ether and a chloroform extractable polyphenylene ether, said resin being decomposable by pyrolysis gas chromatography to form (a) 2-methylphenol, (b) 2,6-dimethylphenol, (c) 2,4-dimethylphenol, (d) 3,5-dimethylphenol and (e) 2,4,6-trimethylphenol in proportions such that said components (a), (b), (c), (d) and (e) satisfy the following inequality:

$$40 \geq \frac{D}{A + B + C + D + E} \times 100 \geq 7.0(\%),$$

wherein A, B, C, D and E represent the areas of peaks on a pyrolysis gas chromatogram attributed to said components (a), (b), (c), (d) and (e), respectively, said chloroform extractable polyphenylene ether being present in an amount of from 0.01 to 20 % by weight, based on the weight of said resin, as determined from the amount of a chloroform extract obtained by treating the resin with chloroform at 23° C. for 12 hours, said chloroform extractable polyphenylene ether containing units of the formula:

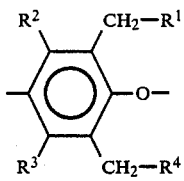   (I)

wherein $R^1$, $R^2$, $R^3$ and $R^4$ each independently represent a hydrogen atom, an alkenyl group represented by the formula:

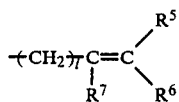   (II)

wherein l is an integer of from 1 to 4, and $R^5$, $R^6$ and $R^7$ each independently represent a hydrogen atom or a methyl group, or an alkynyl group represented by the formula:

$-(CH_2)_k C\equiv C-R^8$   (III)

wherein k is an integer of from 1 to 4 and $R^8$ represents a hydrogen atom, a methyl group or an ethyl group, at least one of $R^1$, $R^2$, $R^3$ and $R^4$ being other than hydrogen, with the proviso that each unit is the same or different.

2. The cured polyphenylene ether resin according to claim 1, wherein said chloroform extractable polyphenylene ether is present in an amount of from 0.01 to 10% by weight, based on the weight of said resin.

3. The cured polyphenylene ether resin according to claim 1 or 2, wherein said alkenyl group is an allyl group.

4. The cured polyphenylene ether resin according to claim 1 or 2, wherein said alkynyl group is a propargyl group.

5. The cured polyphenylene ether resin according to claim 1, wherein said chloroform extractable polyphenylene ether has a viscosity number ($\eta sp/c$) of from 0.05 to 1.0 as measured in a 0.5 g/dl chloroform solution of the chloroform extractable polyphenylene ether at 30° C.

6. A curable polyphenylene ether resin comprising at least one polyphenylene ether represented by the formula:

$Q'$$\text{-}$$[J-H]_m$   (IV)

wherein m is an integer of from 1 to 6, J is a polyphenylene ether chain comprising units of the formula:

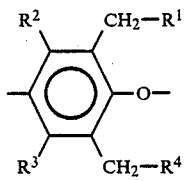   (I)

wherein $R^1$, $R^2$, $R^3$ and $R^4$ each independently represent a hydrogen atom, an alkenyl group represented by the formula:

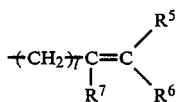   (II)

wherein l is an integer of from 1 to 4, and $R^5$, $R^6$ and $R^7$ each independently represent a hydrogen atom or a methyl group;

or an alkynyl group represented by the formula:

$-(CH_2)_k C\equiv C-R^8$   (III)

wherein k is an integer of from 1 to 4 and $R^8$ represents a hydrogen atom, a methyl group or an ethyl group, at least one of $R^1$, $R^2$, $R^3$, and $R^4$ being other than hydrogen, and Q' represents a hydrogen atom when m is 1, and Q' in each polyphenylene ether independently represents Q or Q substituted with at least one substituent selected from the group consisting of an alkenyl group as defined above and an alkynyl group as defined above when m is greater than 1, said Q representing the residue of a polyfunctional phenol having from 2 to 6 phenolic hydroxyl groups and having unpolymerizable substituents at the ortho and para positions with respect to the phenolic hydroxyl groups, with the proviso that each polyphenylene ether chain is the same or different, said curable polyphenylene ether resin having an average substitution degree of alkenyl and alkynyl groups of from 0.1 to 100 % by mole as defined by the formula:

$$\frac{\text{total number of moles of alkenyl and alkynyl groups in the polyphenylene ether resin}}{\text{number of moles of phenyl groups in the polyphenylene ether resin}} \times 100(\%)$$

the ratio of the total number of moles of alkenyl and alkynyl groups to the number of moles of phenyl groups being determined in terms of the ratio of the total area of peaks attributed to the protons of alkenyl and alkynyl groups to the area of peak attributed to the protons of phenyl groups on a $^1$H-NMR spectrum of the curable polyphenylene ether resin.

7. The curable polyphenylene ether resin according to claim 6, having a viscosity number ($\eta sp/c$) of from 0.2 to 1.0 as measured in a 0.5 g/dl chloroform solution of the resin at 30° C.

8. The curable polyphenylene ether resin according to claim 6 or 7, wherein said average substitution degree is from 0.5 to 50% by mole.

9. The curable polyphenylene ether resin according to claim 6, wherein m is 1 and Q' represents a hydrogen atom.

10. The curable polyphenylene ether resin according to claim 6, wherein m is 2 and Q represents a bifunctional phenol residue.

11. The curable polyphenylene ether resin according to claim 10, wherein said bifunctional phenol residue is represented by the formula:

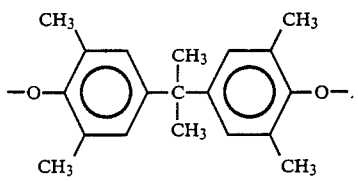

12. The curable polyphenylene ether resin according to claim 10, wherein said bifunctional phenol residue is represented by the formula:

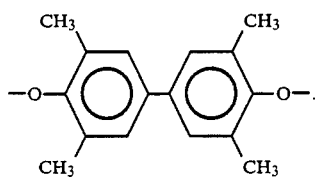

13. The curable polyphenylene ether resin according to claim 10, wherein said bifunctional phenol residue is represented by the formula:

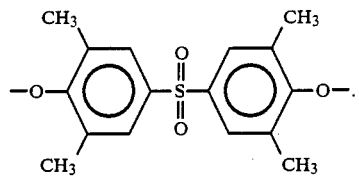

14. The curable polyphenylene ether resin according to claim 6, wherein m is 3 and Q represents a trifunctional phenol residue.

15. The curable polyphenylene ether resin according to claim 14, wherein said trifunctional phenol residue is represented by the formula:

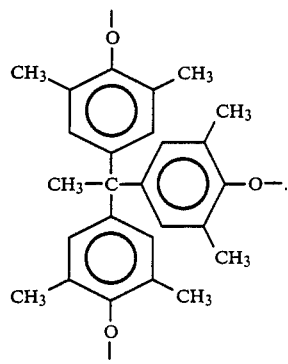

16. The curable polyphenylene ether resin according to any one of claims 6, wherein said alkenyl group is an allyl group.

17. The curable polyphenylene ether resin according to any one of claims 6, wherein said alkynyl group is a propargyl group.

* * * * *

UNITED STATES PATENT AND TRADEMARK OFFICE
CERTIFICATE OF CORRECTION

PATENT NO. : 4,923,932

DATED : May 8, 1990

INVENTOR(S) : KATAYOSE et al

It is certified that error appears in the above-identified patent and that said Letters Patent is hereby corrected as shown below:

Column 58, line 34, "claims 6," should read
--claims 6, 7 and 9 to 15,--;

Column 58, line 37, "claims 6," should read
--claims 6, 7 and 9 to 15,--.

Signed and Sealed this

Fourteenth Day of May, 1991

Attest:

HARRY F. MANBECK, JR.

Attesting Officer

Commissioner of Patents and Trademarks